US012637125B2

(12) United States Patent
Fletcher

(10) Patent No.: US 12,637,125 B2
(45) Date of Patent: May 26, 2026

(54) CYLINDRICAL OBJECT LIFTING SYSTEM AND METHOD

(71) Applicant: Lawrence B. Fletcher, El Cajon, CA (US)

(72) Inventor: Lawrence B. Fletcher, El Cajon, CA (US)

(*) Notice: Subject to any disclaimer, the term of this patent is extended or adjusted under 35 U.S.C. 154(b) by 0 days.

(21) Appl. No.: 19/327,402

(22) Filed: Sep. 12, 2025

(65) Prior Publication Data

US 2026/0077792 A1     Mar. 19, 2026

Related U.S. Application Data

(60) Provisional application No. 63/694,584, filed on Sep. 13, 2024.

(51) Int. Cl.
| | |
|---|---|
| *B62B 1/14* | (2006.01) |
| *B62B 1/12* | (2006.01) |
| *B62B 1/26* | (2006.01) |

(52) U.S. Cl.
CPC .................. *B62B 1/14* (2013.01); *B62B 1/12* (2013.01); *B62B 1/264* (2013.01); *B62B 2202/02* (2013.01); *B62B 2202/80* (2013.01); *B62B 2203/10* (2013.01); *B62B 2203/44* (2013.01); *B62B 2203/70* (2013.01)

(58) Field of Classification Search
CPC ........... B62B 1/002; B62B 1/008; B62B 1/08; B62B 1/12; B62B 1/14; B62B 1/264; B62B 2202/02; B62B 2202/10; B62B 2202/80; B62B 2203/10; B62B 2203/24; B62B 2203/44; B62B 2203/70

USPC ........................ 280/47.21; 414/446–449, 490
See application file for complete search history.

(56) References Cited

U.S. PATENT DOCUMENTS

| | | | | |
|---|---|---|---|---|
| 3,870,177 A | * | 3/1975 | Cobb | B62B 1/14 |
| | | | | 414/607 |
| 4,762,333 A | * | 8/1988 | Mortenson | B62B 1/12 |
| | | | | 280/43.1 |
| 4,981,412 A | * | 1/1991 | Hawkins | B62B 1/264 |
| | | | | 414/454 |
| 6,273,438 B1 | * | 8/2001 | Prapavat | B62B 1/002 |
| | | | | 280/47.21 |
| 6,929,443 B1 | * | 8/2005 | Nellis | B62B 1/08 |
| | | | | 414/490 |
| 7,740,251 B2 | * | 6/2010 | Simmons | B62B 1/264 |
| | | | | 280/43.11 |

(Continued)

*Primary Examiner* — James Keenan
(74) *Attorney, Agent, or Firm* — Rimon PC

(57) ABSTRACT

The present invention relates to a hot water lifting system, comprising a dolly having a dolly base, dolly support having one or more dolly support wheel positionable between a closed position and a deployed position, a multi-position axle guide, a lifting mechanism, one or more track adapted to interface with cradle wheels to permit the cradle wheels to move along the one or more track; a cradle adapted to movably interface with the dolly base and including cradle wheels adapted to interface with the one or more track, a foot mechanism having rotatable feet and means for rotating the rotatable feet, a means for securing the foot mechanism in a lifting position, a strap adapted to wrap around the cylinder, a cradle hold adapted to operably interface with the lifting mechanism latch, and vertical and angled supports adapted to extend the angled support forward of the cradle.

19 Claims, 17 Drawing Sheets

(56)          References Cited

U.S. PATENT DOCUMENTS

| 9,233,699 | B2 * | 1/2016 | Murphy | .................... | B62B 1/14 |
| 10,214,228 | B2 * | 2/2019 | Benton | ................... | B62B 1/264 |
| 10,583,849 | B1 * | 3/2020 | Logsdon, Sr. | ............ | B62B 1/06 |
| 11,952,251 | B2 * | 4/2024 | James | ....................... | B62B 1/14 |

* cited by examiner

101

201

100

200

104

202

102

103

300

208

213

209

210

203

209

210

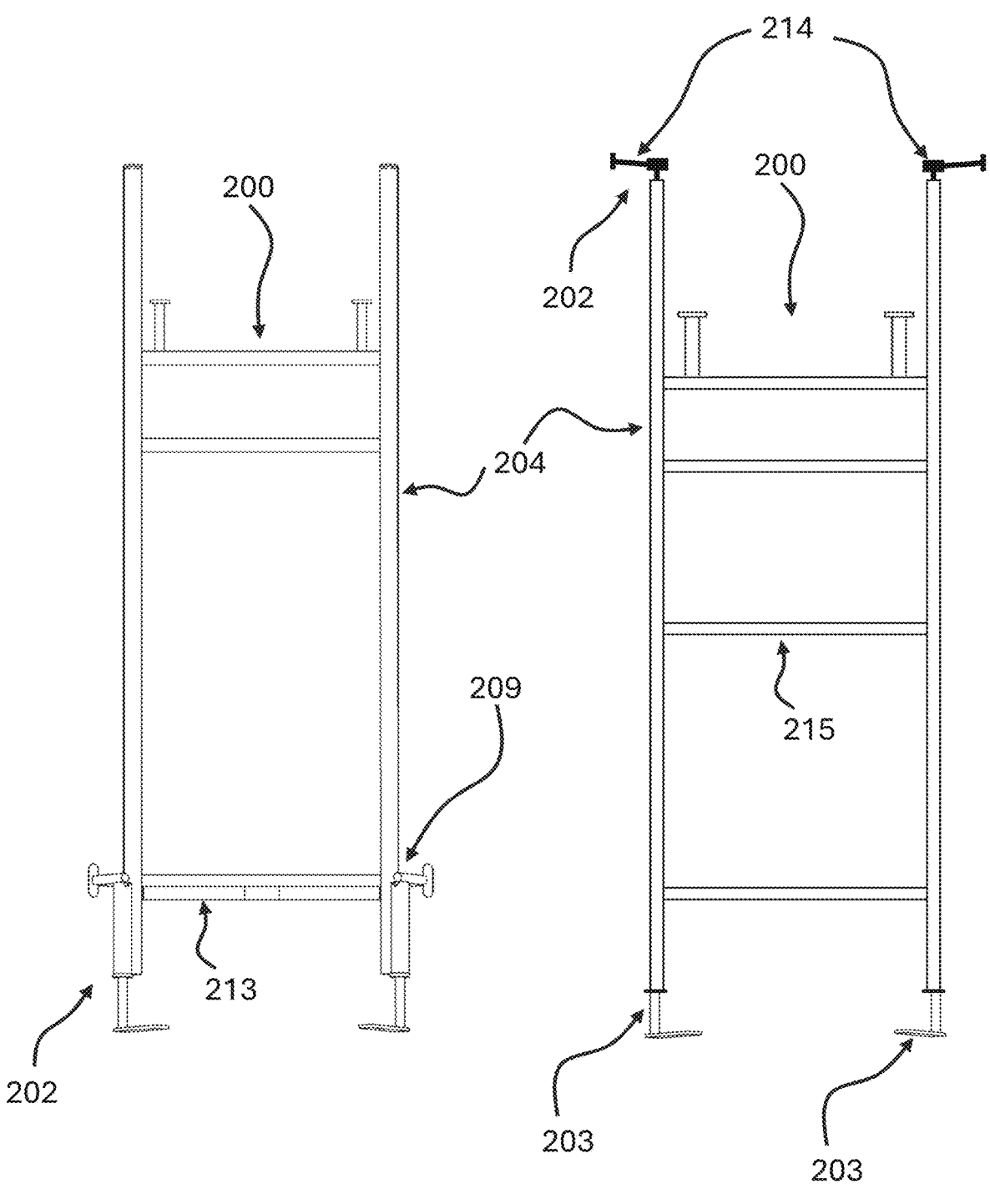
FIG. 10A          FIG. 10B

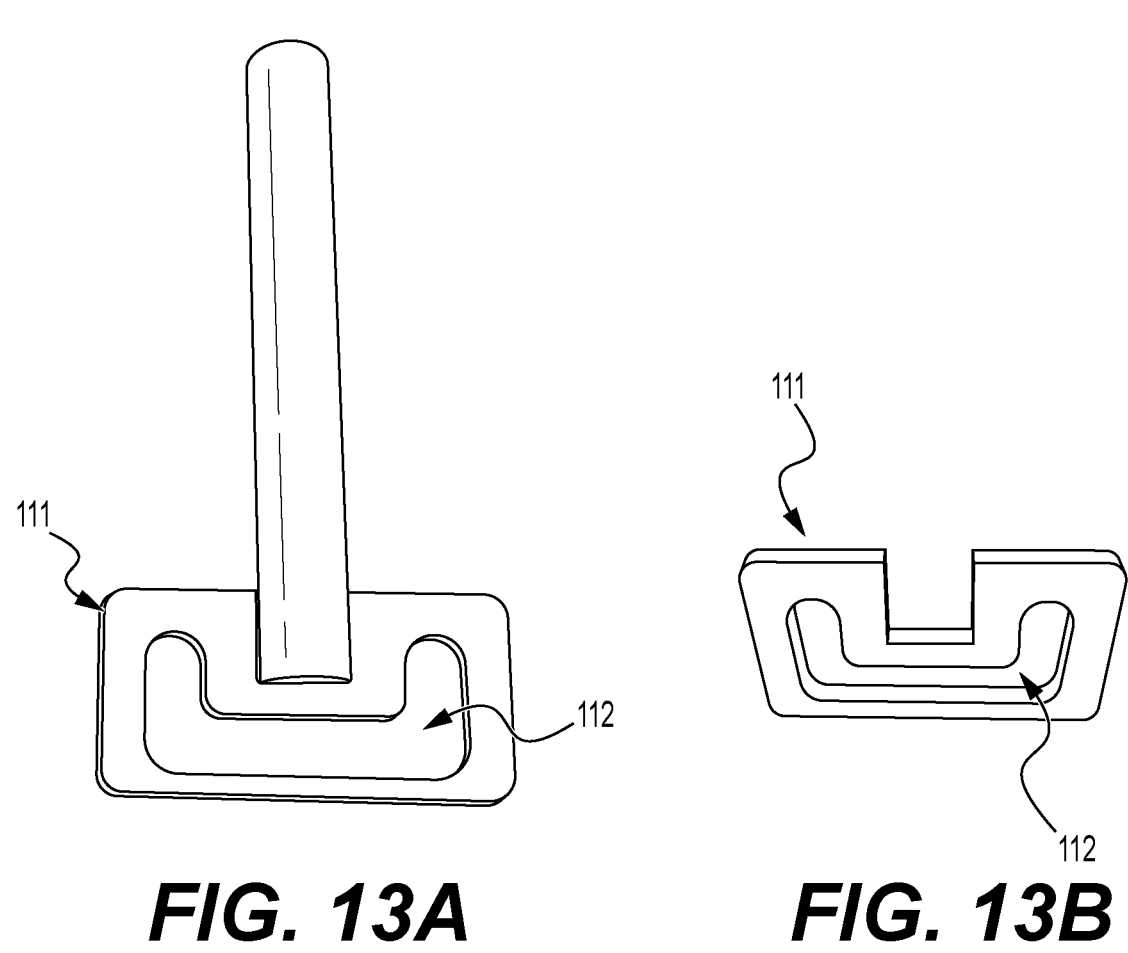
FIG. 13A
FIG. 13B
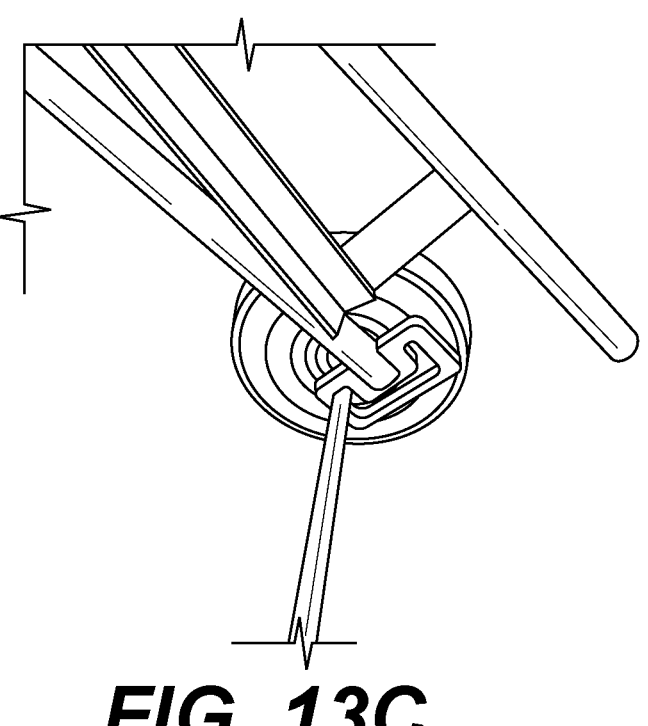
FIG. 13C

110

A→B

110

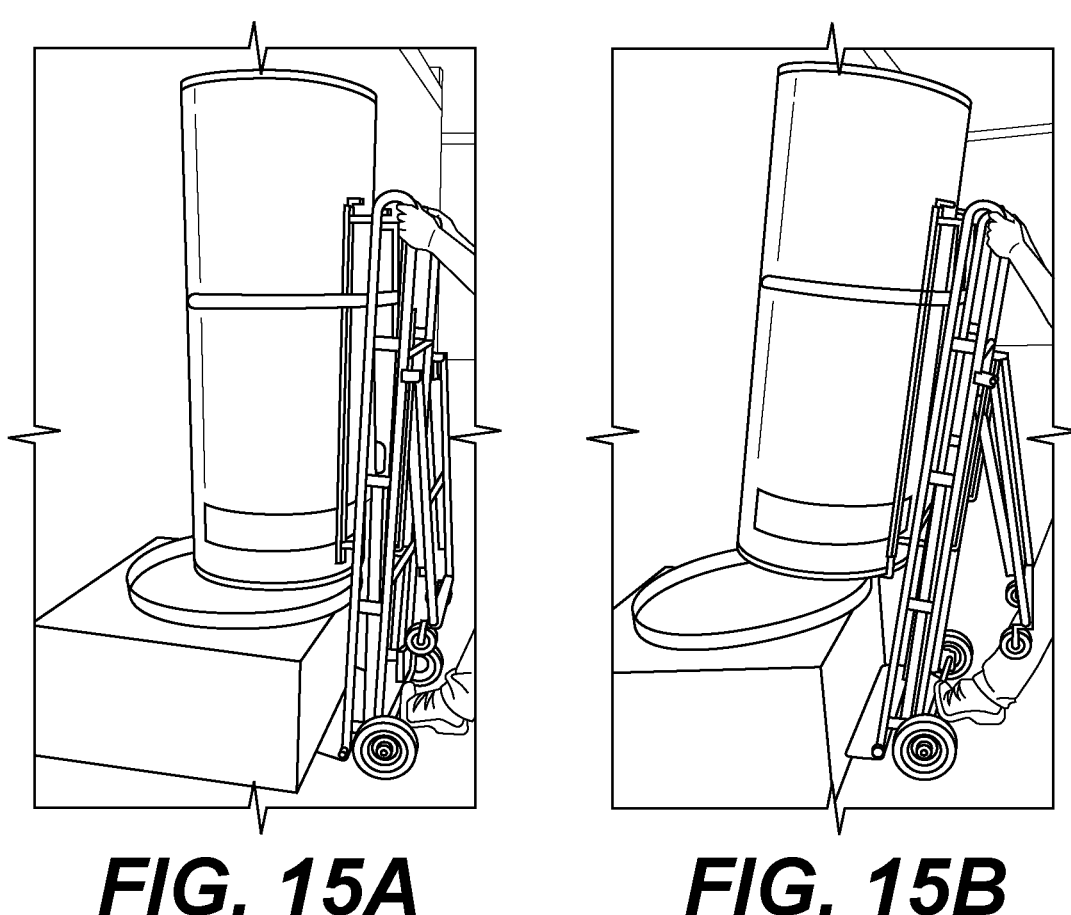
FIG. 15A      FIG. 15B
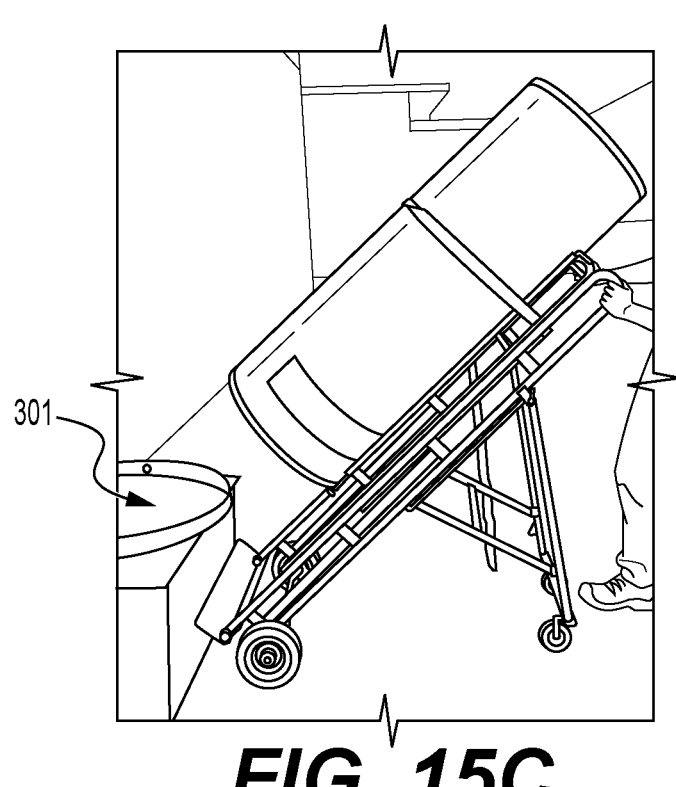
301
FIG. 15C

CYLINDRICAL OBJECT LIFTING SYSTEM AND METHOD

BACKGROUND

In numerous industrial, commercial, and residential settings, the safe transport and positioning of large cylindrical objects such as hot water heaters, pressurized tanks, and fuel cylinders presents persistent logistical and ergonomic challenges. Traditional handling methods often rely heavily on manual lifting, which can expose operators to significant risk of strain injuries, equipment damage, and operational inefficiency. The increasing demand for workplace safety regulations and the desire for streamlined installation and removal procedures have stimulated the development of specialized lifting apparatuses.

Conventional cylinder handling systems are frequently cumbersome, require multiple operators, or lack sufficient adaptability to accommodate variations in cylinder size, installation environment, or floor surface. Existing dollies or hand trucks, for example, may not provide adequate stability or may require awkward maneuvering—especially when navigating confined spaces or uneven terrain. Additionally, the securement of the cylinder during lifting and transport is vital to prevent accidents or damage, yet many existing solutions offer only rudimentary or inflexible methods for stabilizing the load. Hot water heaters are very large, heavy and awkward pieces of machinery. They are often placed in hard-to-reach places in a home and businesses, often in closets or other areas on pedestals and in drain pans. To date, the standard manner of removing and installing hot water heaters involves multiple strong plumbers using braces and straps to lift and position hot water heaters, often leading to injury and workers compensation claims.

The need for more versatile, user-friendly, and effective cylinder moving systems is well known, yet the need remains unanswered. Such innovations are driven by the recognition that equipment installers and service personnel benefit greatly from tools that reduce manual effort, enhance safety, and increase efficiency. As modern hot water heaters and similar appliances continue to increase in size and complexity, the limitations of traditional equipment become more pronounced, highlighting the necessity for improved options.

It is within this landscape of practical necessity and ongoing technological development that the present disclosure seeks to provide a comprehensive solution. By integrating advanced support, lifting, and securing mechanisms into a unified system, this invention addresses the core concerns of safety, adaptability, and ease of use encountered in the handling of heavy cylindrical objects.

SUMMARY

According to embodiments described herein, a cylinder lifting system is provided, comprising: a dolly having a dolly base, one or more handle, a deployable dolly support having one or more dolly support wheel that is positionable between a closed position and a deployed position, a dolly axle, a multi-position axle guide, dolly wheels positioned on opposing ends of the dolly axle, a lifting mechanism, a lifting mechanism latch, means for releasably securing the dolly support to the dolly in the closed position, and one or more track adapted to interface with cradle wheels to permit the cradle wheels to move along the one or more track; a cradle adapted to movably interface with the dolly base and including cradle wheels adapted to interface with the one or more track, a foot mechanism having rotatable feet and means for rotating the rotatable feet, a means for securing the foot mechanism in a lifting position, a strap adapted to wrap around the cylinder, a cradle hold adapted to operably interface with the lifting mechanism latch, and vertical and angled supports adapted to extend the angled support forward of the cradle, wherein the lifting mechanism is adapted to move the lifting mechanism latch between one or more vertical positions, and wherein the multi-position axle guide is adapted to permit the dolly axle to be securably positioned in one or more positions vertically and/or horizontally relative to the dolly.

According to certain embodiments, the lifting mechanism is one or more of a screw drive, a rack and pinion system, hydraulic and/or or pneumatic cylinder, chain and sprocket or belt and pulley system, a lever and linkage mechanism, a worm gear mechanism, a cam and follower mechanism, or a winch and drum system.

Also according to certain embodiments, the strap further includes a magnet adapted to secure to a metal hot water heater.

Also according to certain embodiments, the means for securing the foot mechanism in a lifting position comprises a notch in the foot mechanism adapted to permit the means for rotating the rotatable feet in the notch.

Also according to certain embodiments, the cylinder is a hot water heater.

Also according to certain embodiments, the lifting mechanism is removable.

Also according to certain embodiments, the dolly further comprises a detachable lift skid plate removably attached to the dolly base.

Also according to certain embodiments, the lifting mechanism is laterally repositionable along the dolly cross-supports.

Also according to certain embodiments, the cradle comprises multiple cradle holds positioned to align with the lifting mechanism in different lateral positions.

Also according to certain embodiments, the dolly frame is widened and includes two parallel lifting mechanisms, each engaging a corresponding cradle hold.

Also according to certain embodiments, the axle guide includes bearings at one or more positions to reduce friction during axle movement.

Also according to certain embodiments, the cradle is adapted to receive interchangeable liner plates to accommodate different cylindrical objects.

Also according to certain embodiments, the multi-position axle guide is adapted to permit the dolly axle to be securably positioned horizontally in front of and behind a support of the dolly.

Also according certain embodiments, a method of removing a hot water heater from an installed position comprising: moving the cylinder lifting system of any of the embodiments described above or herein toward the hot water heater; attaching the strap around the hot water heater to secure the cradle to the hot water heater; rotating the dolly on the dolly base toward the hot water heater and actuating the lifting mechanism to move the lifting mechanism vertically upward latch to engage with the cradle hold; continuing to actuate the lifting mechanism to lift one end of the hot water heater off of the ground; placing the rotatable feet under the hot water heater to a lift position and securing the means for rotating the rotatable feet in the means for securing the foot mechanism; moving the dolly axle from a first position to a lifting position, wherein the lifting position is closer to the hot water heater than the first position; actuating the lifting mechanism to lift the hot water heater up and away from its resting position; with the hot water heater attached, rotating the dolly on the dolly base away from the hot water heater; deploying the dolly support to a support position; continuing to rotate the hot water heater away from the installed position until it is supported on the dolly wheels and the dolly support wheels; actuating the lifting mechanism to lower the hot water heater.

Also according certain embodiments, the method further comprises removing a detachable lift skid plate from the dolly prior to engaging the hot water heater.

Also according certain embodiments, the method further comprises repositioning the lifting mechanism laterally along the dolly cross-supports to align with a selected cradle hold.

Also according certain embodiments, the cradle is fitted with interchangeable liner plates to accommodate a non-water-heater cylindrical object.

Also according to certain embodiments, the method further comprises deploying the dolly support to a fully extended position to create a four-wheel carriage for stable transport.

Also according to certain embodiments, wherein the securing strap includes a magnet to facilitate single-operator use.

Also according to certain embodiments, the system is used to lift and transport a hot water heater up to and including 75 gallons in capacity.

These and other embodiments, features, and advantages will become apparent to those skilled in the art when taken with reference to the following more detailed description of various exemplary embodiments of the present disclosure in conjunction with the accompanying drawings.

BRIEF DESCRIPTION OF THE DRAWINGS

The skilled person in the art will understand that the drawings, described below, are for illustration purposes only.

FIG. 10A depicts a front view of an embodiment of the cradle of the present disclosure.

FIG. 10B depicts a front view of another embodiment of the cradle of the present disclosure.

FIG. 12C depicts a side view of a multi-position embodiment of the axle guide of the dolly of the present disclosure, without the axle present.

FIG. 12D depicts a side view of a single-position embodiment of the axle guide of the dolly of the present disclosure, without the axle present.

FIG. 12E depicts a side view of a multi-position embodiment of the axle guide of the dolly of the present disclosure, without the axle present.

FIG. 12F depicts a side view of a multi-position embodiment of the axle guide of the dolly of the present disclosure, without the axle present.

FIG. 13A depicts a side view of a multi-position embodiment of the axle guide of the dolly of the present disclosure, without the axle present.

FIG. 13B depicts a side view of a multi-position embodiment of the axle guide of the dolly of the present disclosure, without the axle present.

FIG. 13C depicts a side perspective view of a multi-position embodiment of the axle guide of the dolly of the present disclosure, with the axle present.

FIG. 15A depicts a side view of an embodiment of the cradle attached to the dolly of the present disclosure in a vertical position with the dolly support in a partially deployed position and holding a hot water heater just after lifting the hot water heater out of the drain pan or just before setting the hot water heater into the drain pan.

FIG. 15B depicts a side view of an embodiment of the cradle attached to the dolly of the present disclosure in a vertical position with the dolly support in a partially deployed position and holding a hot water heater as the hot water heater is lifted away from the drain pan or as the hot water heater moved toward the drain pan.

FIG. 15C depicts a side view of an embodiment of the cradle attached to the dolly of the present disclosure in a vertical position with the dolly support in a fully deployed position and holding a hot water heater as the hot water heater is rolled away from the drain pan or as the hot water heater is rolled toward the drain pan.

DETAILED DESCRIPTION

For clarity of disclosure, and not by way of limitation, the detailed description of the invention is divided into the subsections that follow.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," or it may mean "both."

Other features and advantages of the invention will be apparent from the following detailed description, and from the claims.

Figure 1:
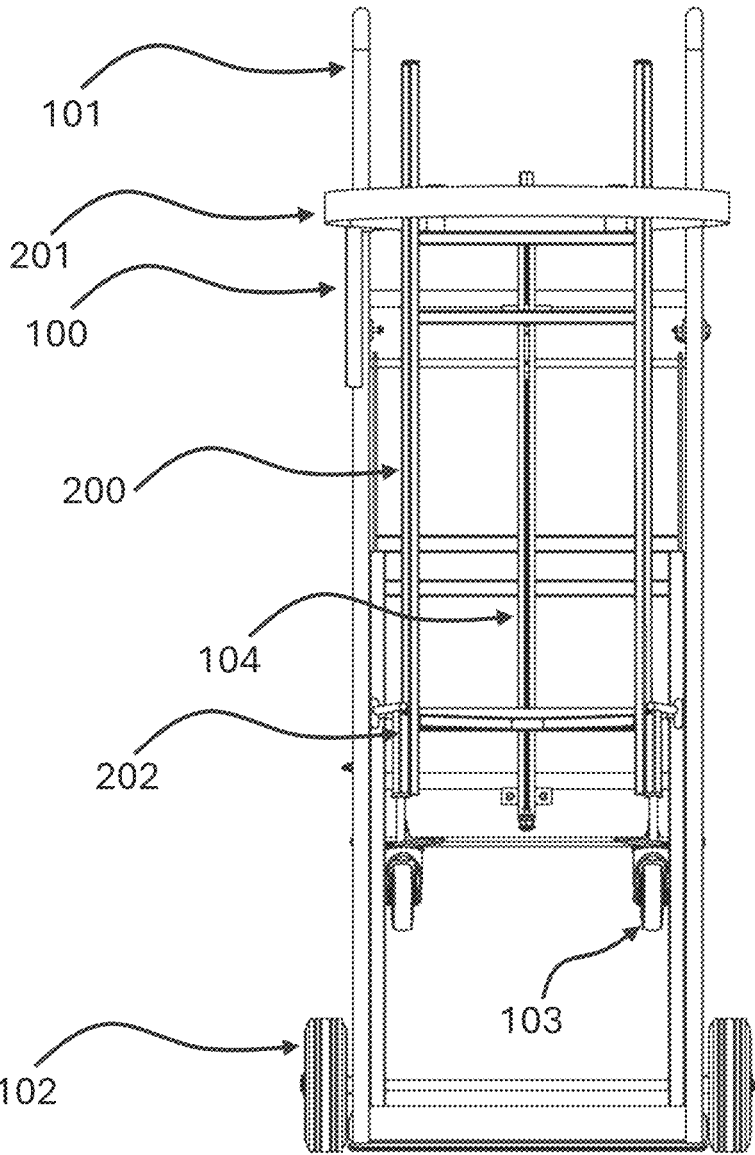
FIG. 1 depicts a front view of an embodiment of the cradle attached to the dolly of the present disclosure.

FIG. 1 depicts a front view of an embodiment of the cradle 200 attached to the dolly 100 of the present disclosure. With regard to the dolly 100, the handles 101 are labelled at the top and the dolly wheels 102 at the bottom, with the dolly support wheels 103 and the screw drive 104 labelled. With regard to the cradle 200, the hot water heater strap 201 is labeled along with the foot mechanism 202.

Figure 2:
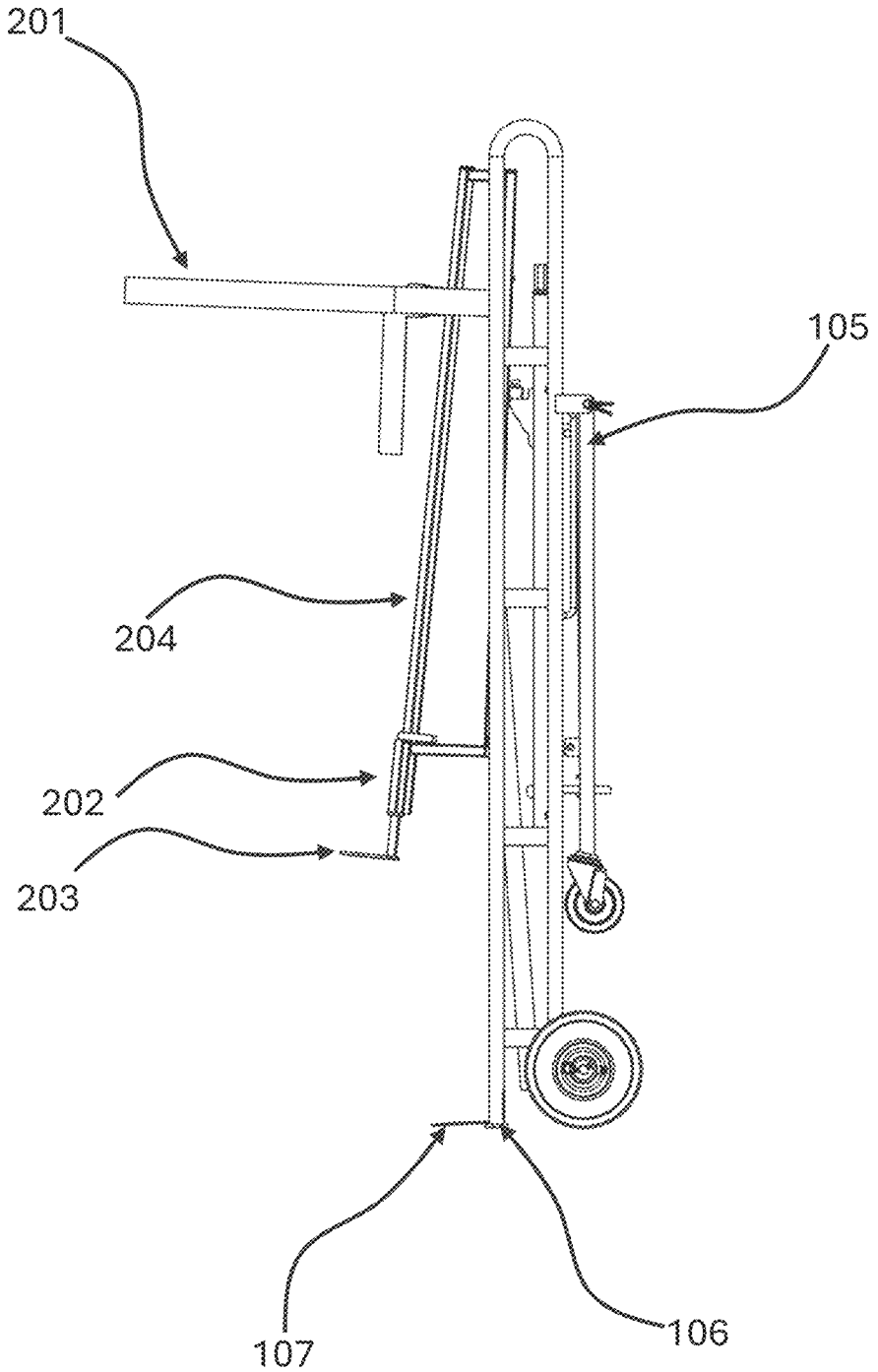
FIG. 2 depicts a side view of an embodiment of the cradle attached to the dolly of the present disclosure.

FIG. 2 depicts a side view of an embodiment of the cradle attached to the dolly of the present disclosure. The relative positioning of the cradle 200 can be seen attached with the dolly 100. In this view the dolly support 105 is shown on the back of the dolly 100. The detachable skid plate 107 is shown at the bottom of the dolly 100 along with the dolly base 106. The angled cradle support 204 is shown extending from the top down to the cradle foot mechanism 202 and cradle feet 203. The hot water heater strap is also shown, which strap may optionally include a magnet on one end to aid in wrapping the strap around the hot water heater by a single user. In use one end of the strap having the magnet is positioned partially around the hot water heater and held in place by the magnet where the user can grab the strap from the opposite side of the hot water heater to attach it to the connecting end of the strap to tighten around the hot water heater.

Figure 3:
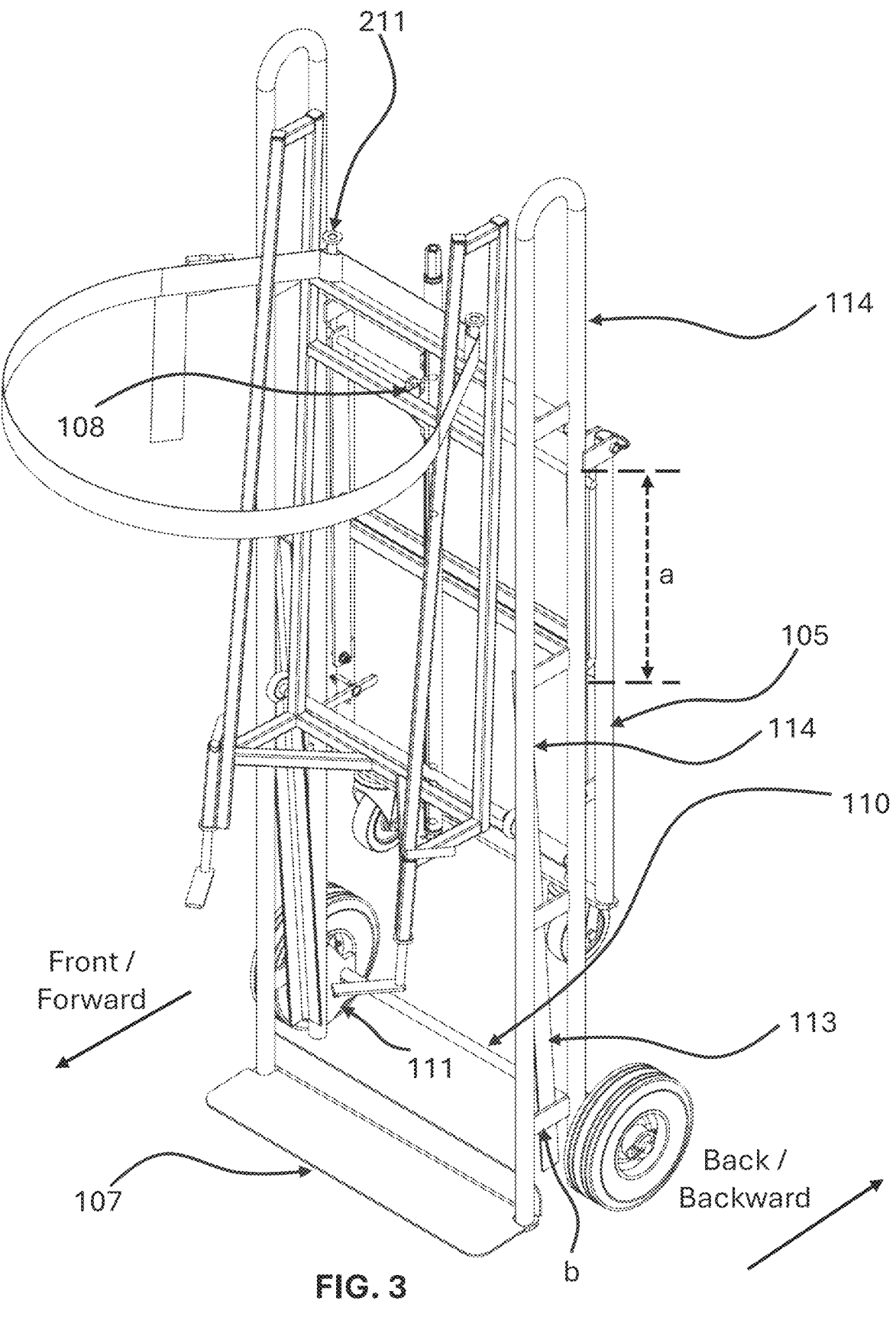
FIG. 3 depicts a perspective view of an embodiment of the cradle attached to the dolly of the present disclosure in a vertical position with the dolly support in a closed and latched position.

FIG. 3 depicts a perspective view of an embodiment of the cradle attached to the dolly of the present disclosure in a vertical position with the dolly support in a closed and latched position. The relative positioning of the cradle 200 can be seen attached with the dolly 100. In this view the cradle track 113 on the dolly is shown, where it is positioned at an angle that permits the cradle to roll along the cradle track 113 in a manner that lifts the cradle further out in front of the dolly 100 as the cradle rises in the cradle track 113 from the lower end to the upper end of the cradle track 113. Stated differently, in preferred embodiments the cradle track is angled relative to vertical supports 114 of the dolly 100 such that the bottom of the cradle track 113 is positioned more toward the back of the dolly than the top of the cradle track 113. In such embodiments, the cradle track 113 slopes from a position located more toward the back of the dolly 100 to a position that is more toward the front of the dolly 100 along its length, from the bottom of the cradle track 113 to the top of the cradle track 113. Grooves are shown in the cradle track 113 for positioning of the wheels of the cradle 206 to roll along the cradle track 113 as it is lifted and lowered in the dolly 100. The screw drive latch 108 on the screw drive of the dolly 100 can also be seen in this view. This screw drive latch 108 is positioned such that it inserts into the cradle hold on the cradle 200 to create a secure lifting arrangement connected with the cradle 200. The cradle 200 is thus connected with the dolly 100 in at least three positions, including the two cradle wheels 206 and the cradle hold 208 connected with the screw drive latch 108. The attachment point on the screw drive 104 for connection of a mechanism for turning the screw drive (e.g., a drill, screw gun, etc.) is also depicted at the top of the screw drive 104. Strap attachments on the cradle 211 are also shown. The detachable skid plate 107 is also shown at the bottom of the dolly along with the dolly axle 110.

As is also depicted in FIG. 3, the attachment position of dolly support 105 may vary across distance "a." Such position may be higher or lower than the positional range of "a" the depicted distance range is exemplary only. Alternative positioning of the attachment position of dolly support 105 may be provided for additional or less leverage and also yield a varying angle of support for the dolly when the dolly is resting on the dolly support 105. As is also indicated in FIG. 3, the position of the axle guide 111 may be alternatively placed to be within or between "b" vertical supports 114 to place the axle closer to the load to be carried by the dolly in a vertical plane.

While FIG. 3 depicts the cradle 200 composed of square structural rods and the dolly 100 depicted as having round structural rods, this is exemplary only as the specific shape of the support rods is unimportant so long as it has sufficient strength and rigidity for the systems described herein. In an alternative embodiment, the cradle and/or the dolly may be composed of one or more round structural rods. In the same or additional embodiments, the cradle and/or the dolly may be composed of one or more square structural rods. In the same or additional embodiments, the cradle and/or the dolly may be composed of one or more rectangular, hexagonal. Octagonal, triangular, half-round, I-beam, oval, or other shaped structural rods.

In an alternative set of embodiments of the present disclosure, the cradle 206 is movably attached to the dolly 100 such that the movement of the cradle 206 on dolly 100 is supported by the cradle track 113, which cradle track acts as a guide assembly that the cradle is movably positioned within. In such embodiments often the cradle is not adapted to be readily removable from the dolly during operation. In such embodiments, often the guide assembly is adapted to permit the cradle to travel as a unit or rotate the cradle feet 203 in the forward direction for better positioning of the cradle to accept or place objects and then travel or rotate in the backward direction toward the dolly. The guide assembly also permits the cradle to travel vertically relative to the dolly, e.g., when actuated to do so using the lifting mechanism (e.g., screw drive).

Figure 4:
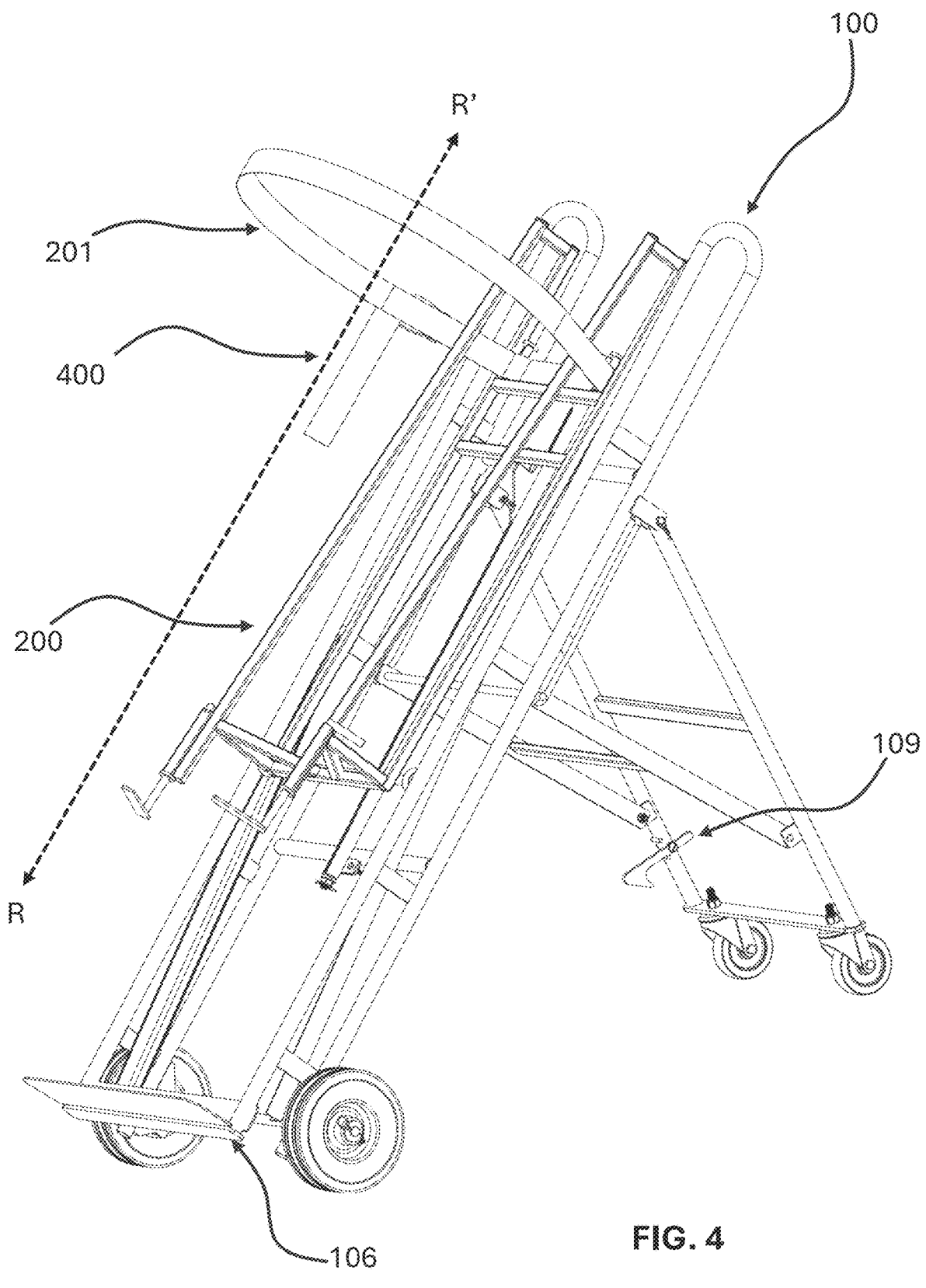
FIG. 4 depicts a perspective view of an embodiment of the cradle attached to the dolly of the present disclosure with the dolly support deployed.

FIG. 4 depicts a perspective view of an embodiment of the cradle 200 attached to the dolly 100 of the present disclosure with the dolly support 105 deployed. The dolly support releasable attachment 109 is shown detached from the main support of the dolly 100. When the dolly support is in a non-deployed state it is secured to the dolly main support using the releasable attachment 109. The releasable attachment in this embodiment is spring loaded such that pushing on one end, lifts the clip up and out of an attachment point for the releasable attachment 109 on the dolly 100, permitting the dolly support 105 to extend out, away from the back of the dolly 100 to a secure position that is capable of holding the weight of a hot water heater between the wheels on the support mechanism 103 and the main wheels of the dolly 102. The relative movement direction of the cradle 200 on the dolly 100 is also depicted with a dotted arrow 400. The cradle 200 is capable of moving between direction R (lowering) to direction R' (raising). In this figure, dolly base 106 is shown, below and supporting the detachable skid plate 107.

Figures 5A, 5B:
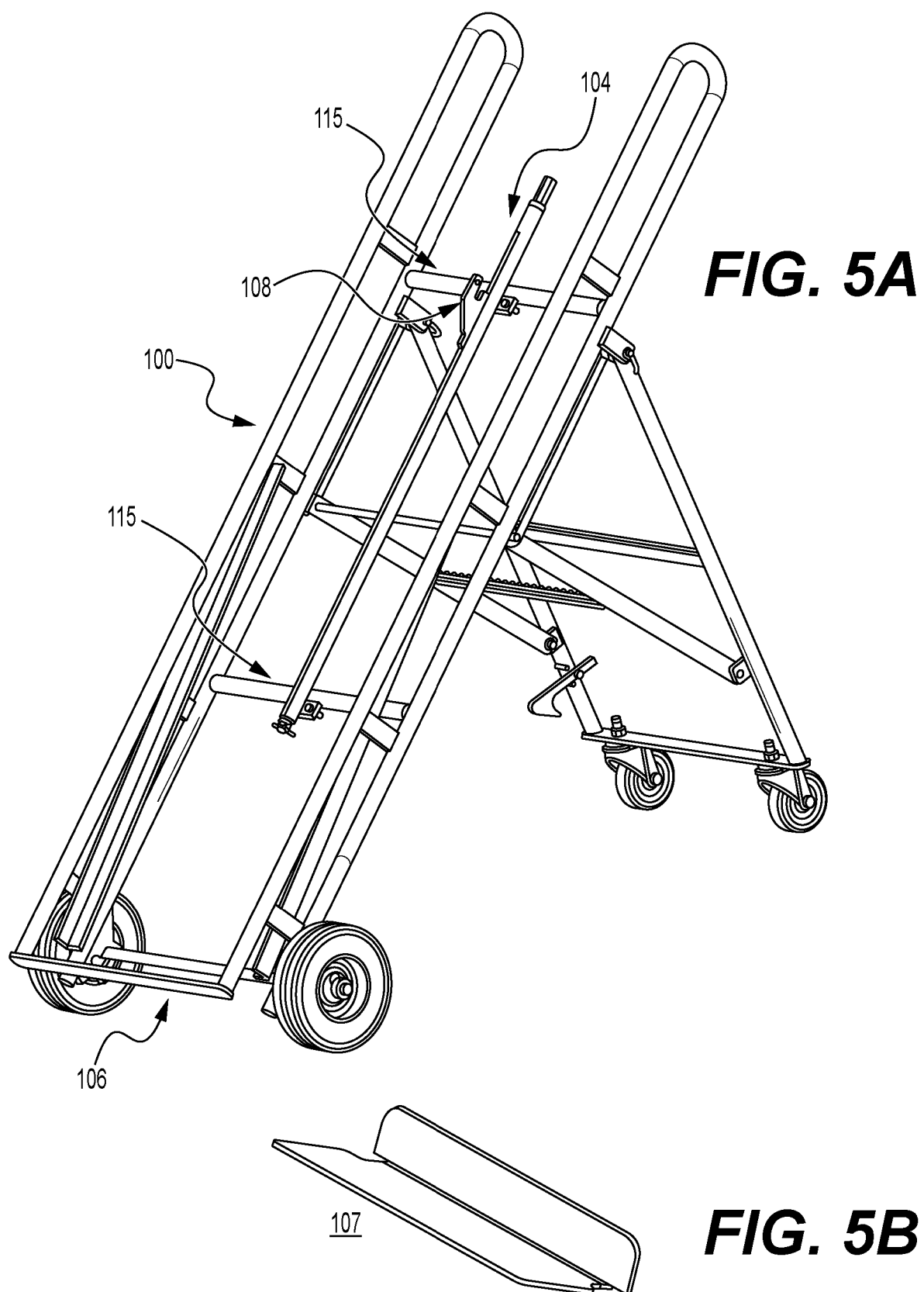
FIG. 5A depicts another perspective view of an embodiment of the cradle attached to the dolly of the present disclosure with the dolly support deployed and the detachable lift skid removed.
FIG. 5B depicts an exemplary detachable lift skid of the present disclosure.

FIG. 5A depicts another perspective view of an embodiment of the dolly of the present disclosure with the dolly support deployed and the detachable lift skid removed. In this Figure, the lifting mechanism, which in this embodiment is a screw drive 104 with a screw drive latch 108 adapted for engaging with a cradle, is depicted. The lifting mechanism is depicted in this embodiment as attached to the frame of the dolly in a fixed position using a weld and/or bolted attachment. This embodiment depicts a centered arrangement of the lifting mechanism on the dolly, which is simply one exemplary placement of the lifting mechanism. Other related embodiments (not depicted) may include a lifting mechanism that is positioned to one side or another away from the center on the dolly. In such embodiments it is important to similarly adapt the cradle 200 such that the cradle hold 208 is aligned with the screw drive latch 108 in a position such that the screw drive latch 108 will engage with the cradle hold in operation. In one such arrangement, the screw drive is positioned between 1-8 inches off-center to the right or left on the dolly and the cradle hold 208 is correspondingly positioned at a position 1-8 inches off of center to the right or left, as the case may be, on the cradle 200 in a manner that aligns with the screw drive latch 108. Depending on the width of the dolly and cradle, the distance the screw drive 104 can be positioned off-center may vary greater than 8 inches or less than 1 inch, including abutting the vertical frame of the dolly 100. In other embodiments described herein the lifting mechanism may be detachable from the dolly, including detachable and positionable laterally anywhere along the dolly cross supports that support the lifting mechanism. Presence and use of multiple lifting mechanisms on a single dolly is also contemplated, though not specially depicted.

Also in FIG. 5A, with the detachable skid plate 107 removed, the dolly base 106 can be clearly viewed. The lifting mechanism 104 is shown along with cross-supports 115 on the dolly that serve as the attachment/engagement positions for the lifting mechanism 104. While the screw drive is shown as bolted to the cross-supports 115 in this figure, other manners of attachment including both fixed and removable attachments of the lifting mechanism are also contemplated. FIG. 5B depicts an exemplary detachable lift skid plate 107 of the present disclosure. Notches in the side of the detachable lift skid plate 107 can be seen, which are sized and adapted to interface with the dolly supports that extend up and form the dolly handles 101 and dolly base 106 of the dolly 100 such that it can be securely connected with and removed from the dolly 100. Other manners of attaching the detachable lift skid plate 107 are contemplated, including clips, bolts, magnets, friction fit and other arrangements.

Figure 5C:
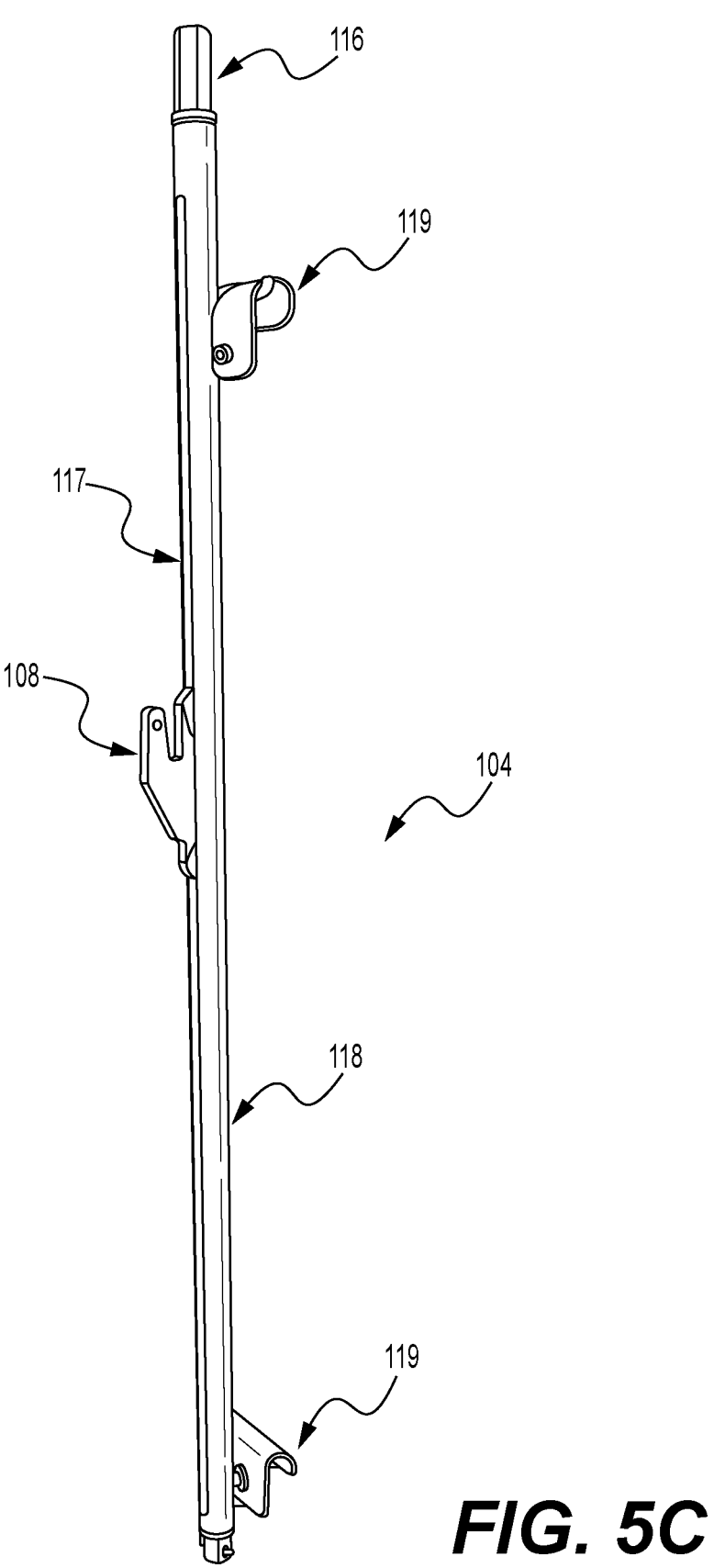
FIG. 5C depicts an embodiment of a removable/detachable lifting mechanism.

FIG. 5C depicts an embodiment of a removable lifting mechanism 104, in this embodiment being a screw drive. The lift screw 116 is located at the top and serves as the point at which a device such as a drill or screw gun is attached to turn the lift screw and operate the screw drive latch 108, which travels vertically in the screw drive channel 117 formed within the screw drive housing 118. This embodiment of the removable lifting mechanism includes clips 119 for attachment on cross-supports 115 of the dolly. In this embodiment the clips are rounded to correspond to the embodiment of the cross-supports 15 of the dolly depicted herein that has round cross-supports. This shape and the overall appearance of the clips may vary with the limitation that it provides a solid connection with the dolly (e.g., on the cross-supports) in a manner that can support and lift heavy weights such as large hot water heaters.

Figures 5D, 5E:
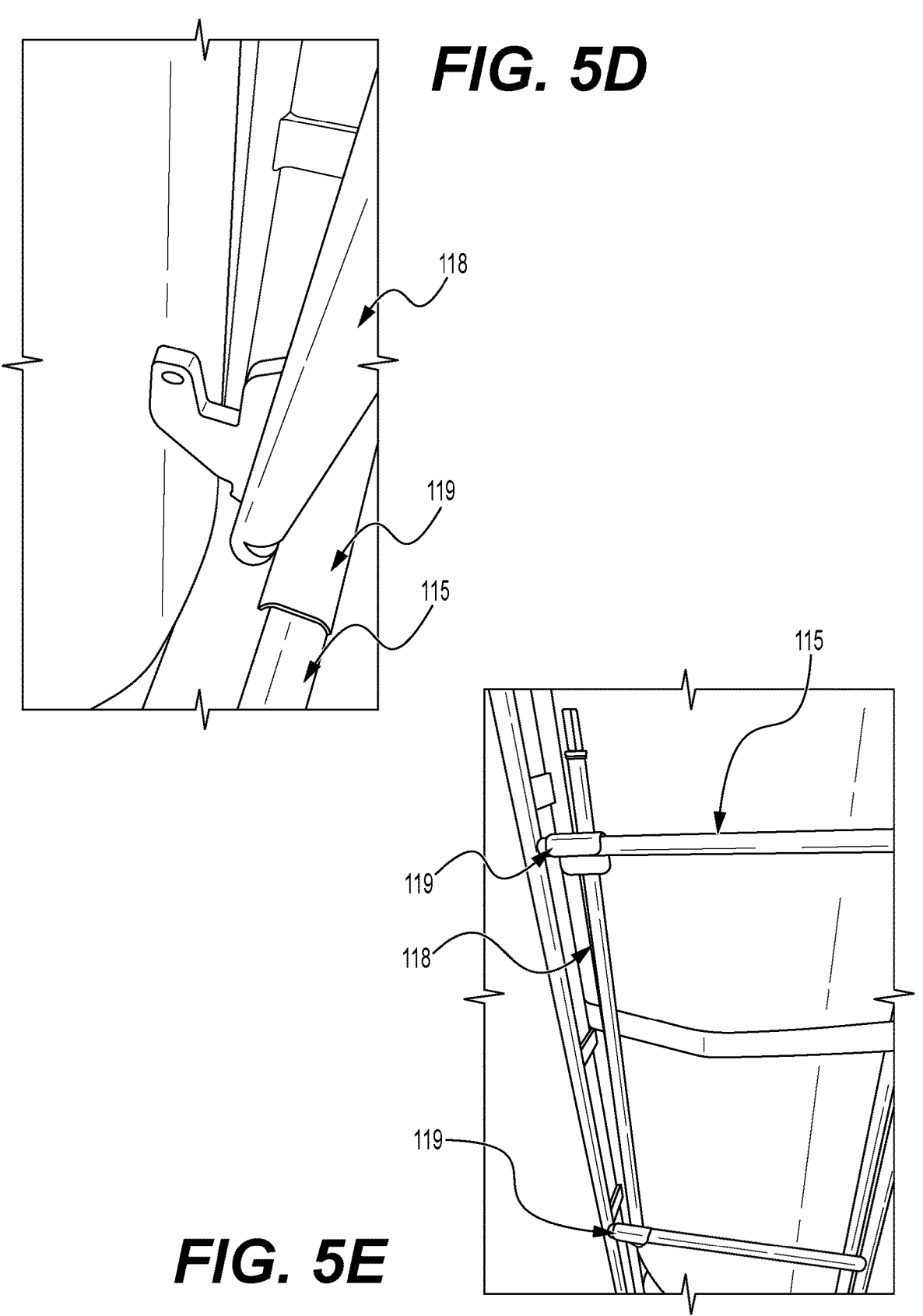
FIG. 5D depicts the use of a removable/detachable lifting mechanism on an exemplary dolly.
FIG. 5E depicts another view of the use of a removable/detachable lifting mechanism on an exemplary dolly.

FIGS. 5D and 5E depict an embodiment of a removable lifting mechanism attached to a dolly, including each of the relevant aspects of the lifting mechanism and dolly described in connection with FIG. 5C. With specific regard to FIG. 5E, the removable lifting mechanism is shown positioned to one side of the cross-supports 115. In such embodiments, a strap may be used on the dolly to secure the hot water heater to the dolly. The removable lifting mechanism can be positioned anywhere along the cross-supports 115 in this embodiment simply by sliding it along the cross-supports. An advantage provided with this configuration of the system is that it permits the dolly to be used without the cradle since the lifting mechanism can be moved to the side to permit clearance between the hot water heater and the screw drive latch 108, which would otherwise be in the way and prevent the hot water heater from resting against the cross-supports.

While the embodiments describe and depict a screw drive mechanism as a frequently preferred lifting mechanism, this is intended to be non-limiting. Other mechanisms may be employed in any of the contemplated embodiments of the present systems. For example, a rack and pinion system may be employed having a circular gear (pinion) engaging a linear gear (the rack). Rotating the pinion moves the rack in a straight line. Alternatively, a hydraulic and/or or pneumatic cylinder may be employed, which uses pressurized fluid (hydraulic) or air (pneumatic) to move a piston linearly, which can lift or move loads on the dolly. Alternatively, chain and sprocket or belt and pulley system may be employed where rotational motion is transferred via a chain or belt to lift or move loads, often using a drum or winch. Alternatively, a lever and linkage mechanism (e.g., Scissor Lift) may be employed that uses interconnected levers or linkages to amplify force and produce linear motion from rotational input. Alternatively, a worm gear mechanism may be employed, which is similar to a screw drive where a worm (screw) meshes with a worm gear to produce slow, powerful linear or rotary motion. Alternatively, a cam and follower mechanism may be employed where a rotating cam imparts linear motion to a follower, which can be used for lifting or pressing. Alternatively, a winch and drum system may be employed where a cable or rope is wound around a drum; rotating the drum lifts or lowers the load. As used herein, the term "lifting mechanism" is intended to refer to each of these mechanisms and systems, including the screw drive system and/or each of the additional mechanisms and systems.

Figure 6:
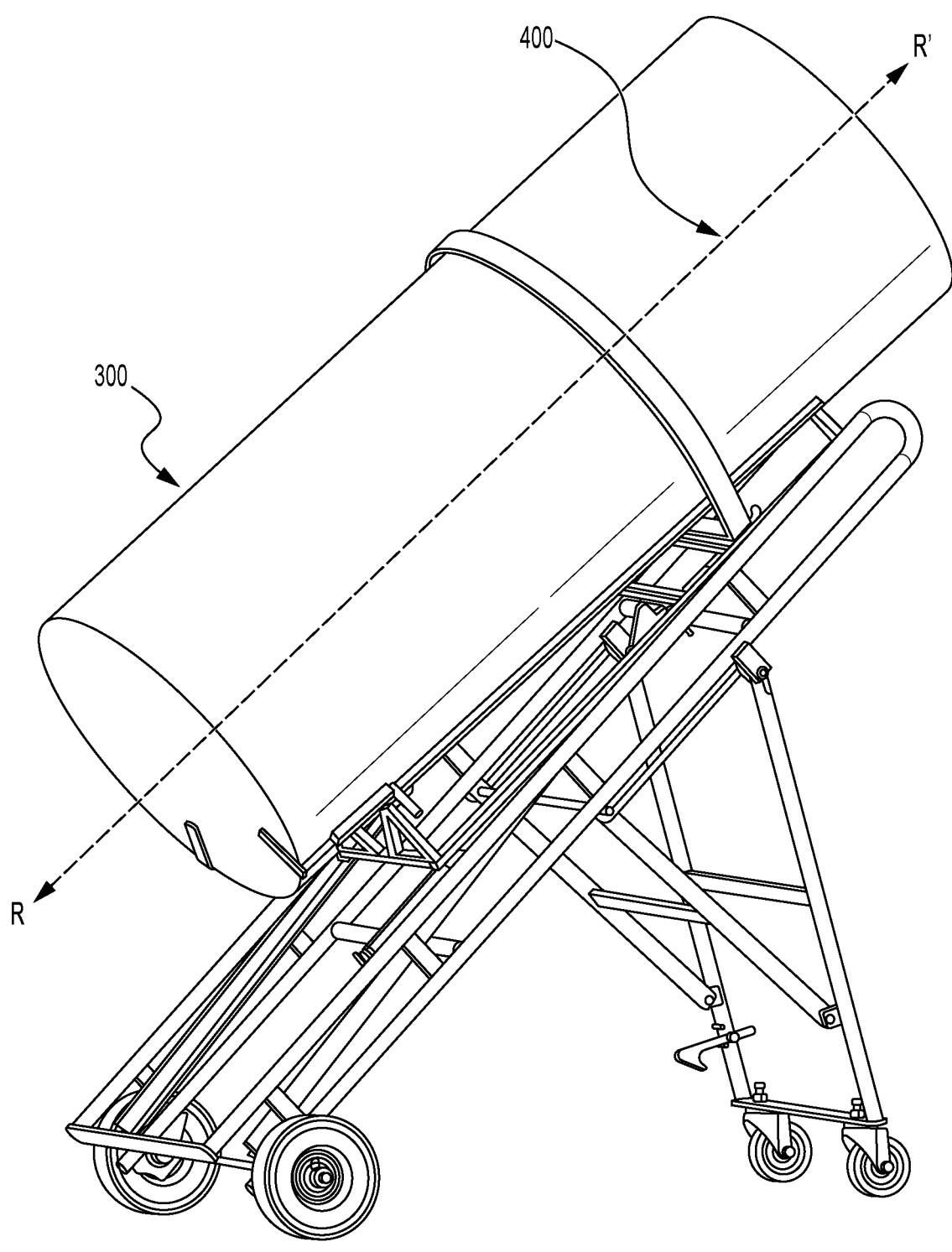
FIG. 6 depicts a perspective view of an embodiment of the cradle attached to the dolly of the present disclosure with the dolly support deployed and holding a hot water heater.

FIG. 6 depicts a perspective view of an embodiment of the cradle 200 attached to the dolly 100 of the present disclosure with the dolly support 105 deployed and holding a hot water heater 300. The relative movement direction of the cradle 200 on the dolly 100 is also depicted with a dotted arrow 400. The cradle 200 is capable of moving between direction R (lowering) to direction R' (raising). The hot water heater strap 201 is wrapped around and securing the hot water heater to the cradle 200.

Figure 7:
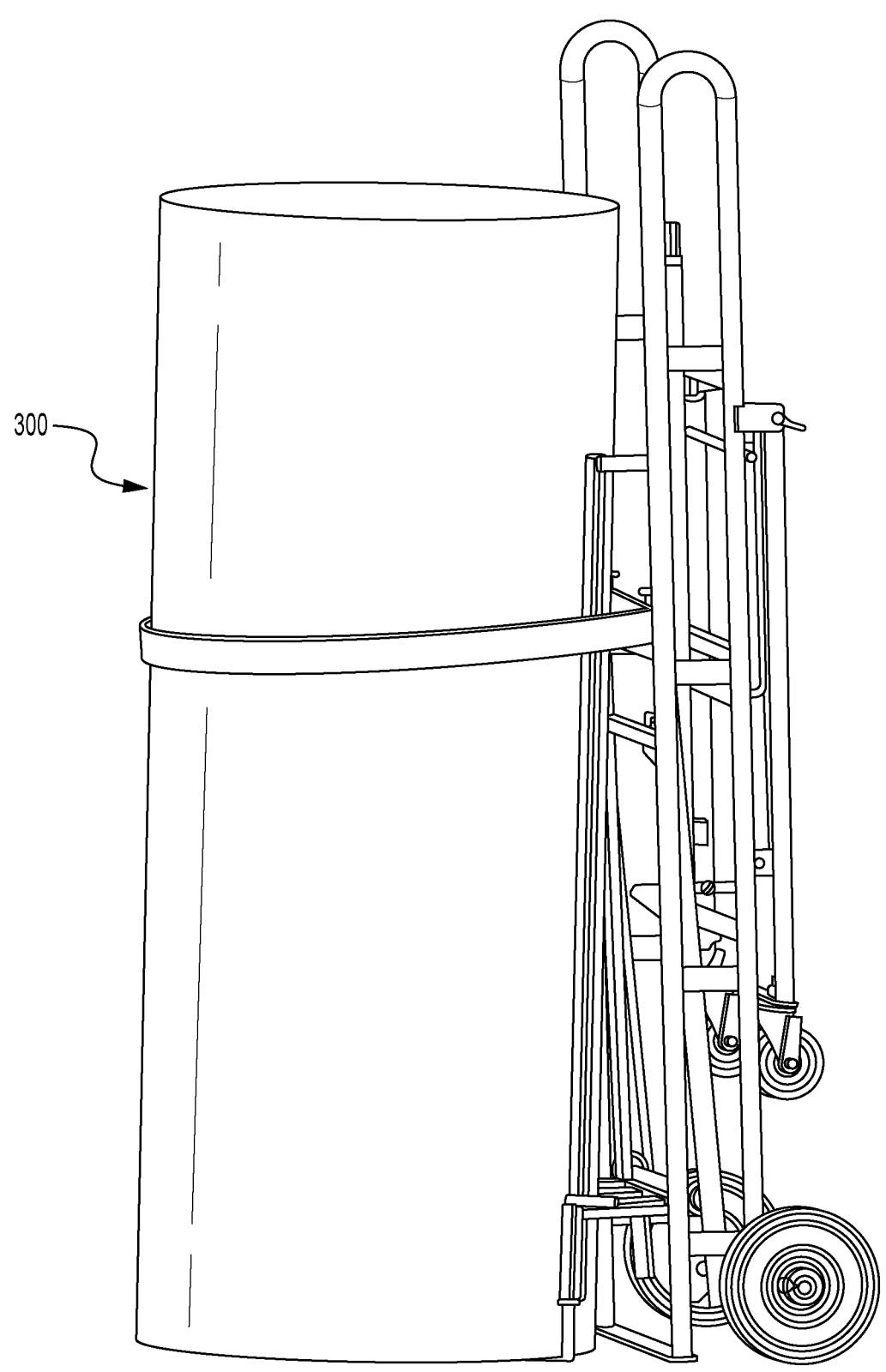
FIG. 7 depicts a perspective view of an embodiment of the cradle attached to the dolly of the present disclosure in a vertical position with the dolly support in a closed and latched position and holding a hot water heater.

FIG. 7 depicts a perspective view of an embodiment of the cradle 200 attached to the dolly 100 of the present disclosure in a vertical position with the dolly support 105 in a closed and latched position and holding a hot water heater 300. The hot water heater strap 201 is wrapped around and securing the hot water heater to the cradle 200.

Figure 8:
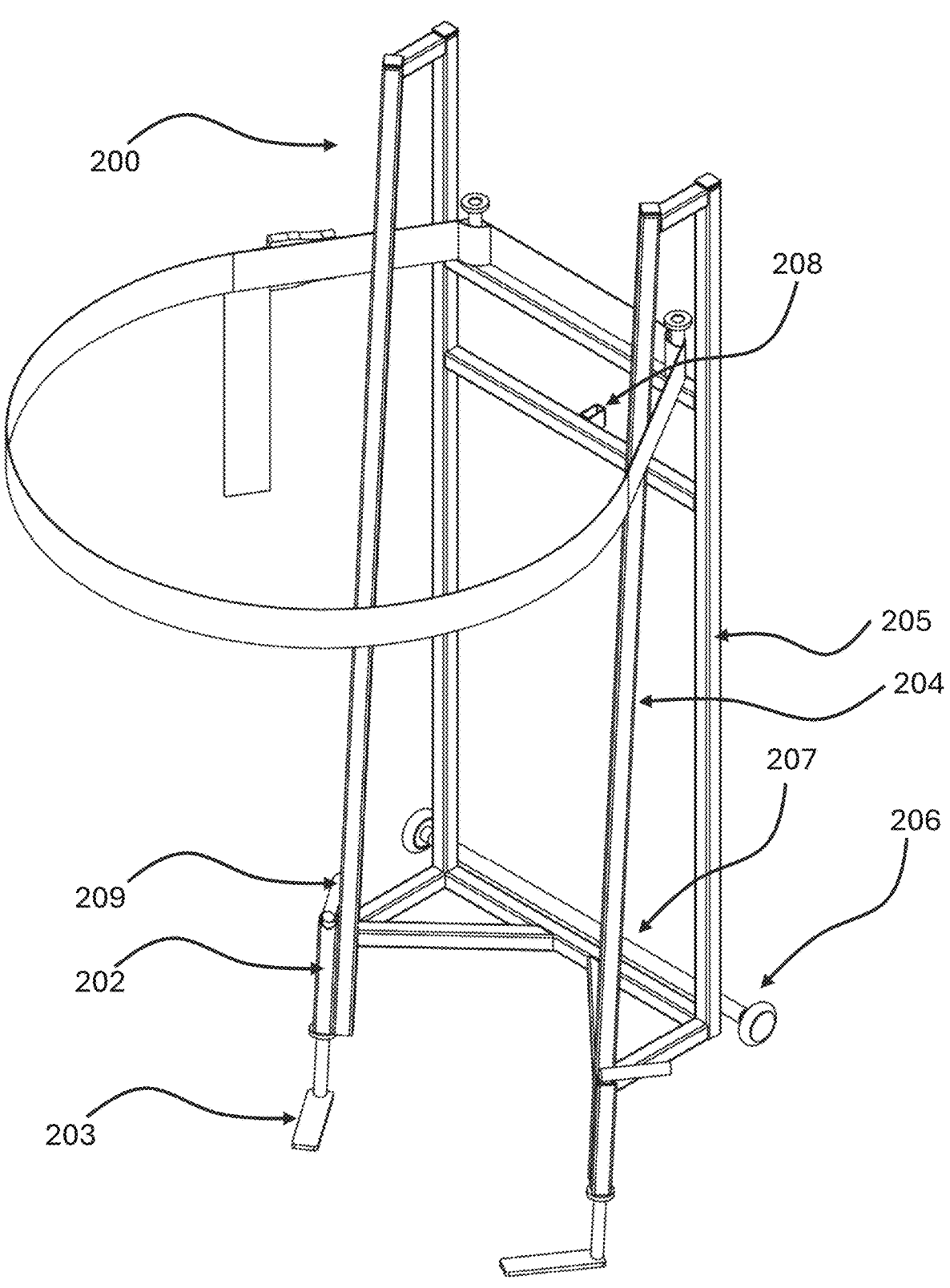
FIG. 8 depicts a perspective view of an embodiment of the cradle of the present disclosure.

FIG. 8 depicts a perspective view of an embodiment of the cradle 200 of the present disclosure. The vertical 205 and angled 204 cradle upright supports are depicted. It can be seen in the depicted embodiment, that the vertical 205 and angled 204 upright supports angle away from one-another from the top to the bottom of the cradle 200. This orientation acts, for example, to fill the area between the dolly and the hot water heater when in use so that the dolly does not need to be as close to the hot water heater while also permitting the system to operate as described using a single operator. FIG. 8 also shows the cradle foot mechanism 202, including cradle foot handles 209 and cradle feet 203. The cradle foot mechanism 202 is adapted to permit rotation of the cradle feet 203 by manipulating the cradle foot handles 209. As such, the cradle foot handles 209 are operably connected with the cradle feet 203. The foot mechanism is adapted to permit rotation of the feet up within the cradle foot mechanism 202 up to about 270° or up to about 300°. In often included embodiments, the foot mechanism is adapted to permit rotation of the feet up within the cradle foot mechanism 202 up to about 180°. FIG. 8 also shows the cradle axle 207 and cradle wheels 206. As indicated above, the cradle wheels are adapted to operably interface with the cradle track 113 to permit the wheels to roll up and down along the cradle track 113 when the cradle 200 is raised and/or lowered in the dolly using the lifting mechanism. Cradle hold 208 is also depicted, which is sized and adapted to securely interface with the lifting mechanism. In the depicted embodiment, the lifting mechanism includes a screw drive latch 108 that is essentially a lip that inserts within the opening of the cradle hold 208. While this is one depicted embodiment, a variety of manners of accomplishing the same purpose are contemplated and considered to fall within the present disclosure with the following limitations.

Figures 9A, 9B, 9C:
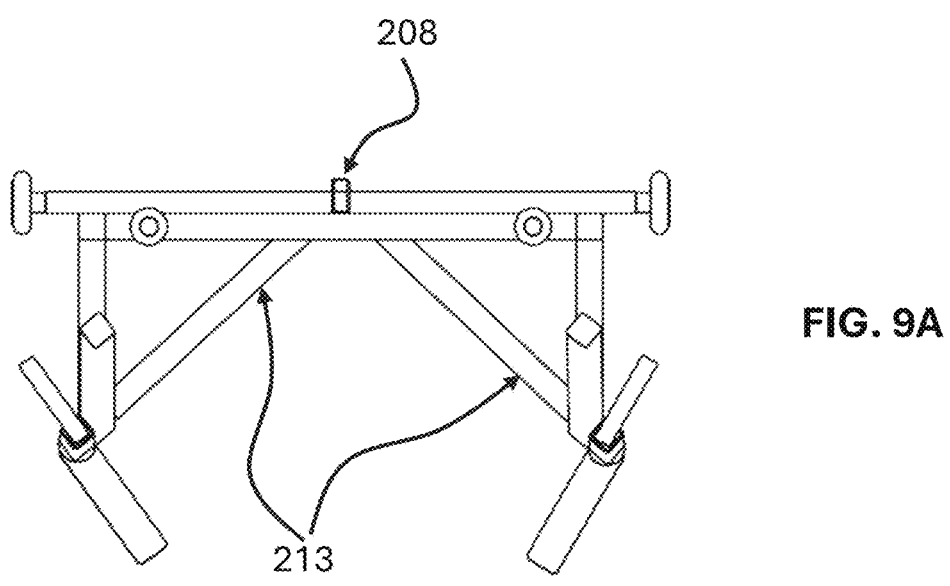
FIG. 9A depicts a top view of an embodiment of the cradle of the present disclosure.
FIG. 9B depicts a front view of an embodiment of the foot mechanism of the cradle of the present disclosure.
FIG. 9C depicts a close-up view of the top portion of the foot mechanism of the cradle of the present disclosure, showing the foot handle, foot support and notch in the foot support.

FIG. 9A depicts a top view of an embodiment of the cradle of the present disclosure. The free area for rotation of the foot mechanism can be easily seen. Optional supports 213 are included in the depicted embodiment but are often not included. FIG. 9B depicts a front view of an embodiment of the foot mechanism of the cradle of the present disclosure. FIG. 9C depicts a close-up view of the top portion of the foot mechanism of the cradle of the present disclosure, showing the foot handle, foot support and notch in the foot support. Between FIGS. 9B and 9C, notch 210 can be seen. In practice not only can the handle and foot rotate within the foot mechanism, but limited vertical movement of the foot is also provided. Notch 210 provides a secure resting position for the foot handle 209 when it has been rotated to the lift position. This lift position is a position where the feet are located positioned at or about a radial position relative to the center of the circumference of the hot water heater. The handles can rotate and slide along the top of the foot mechanism, but when they reach the lift position, the handle drops into the notch 210, whereby preventing further rotation of the cradle foot. In practice the user of the system rotates the foot to the lift position when ready to lift the hot water heater. After placement of a hot water heater, if the hot water heater is located in a tight hard to reach location, the cradle feet can be rotated out of the way to permit the cradle to me moved vertically then horizontally away from the hot water heater.

FIG. 10A depicts a front view of an embodiment of the cradle of the present disclosure that includes the cradle foot mechanism 202 as a mechanism attached to the lower region of the angled cradle supports 204. Optional supports 213 are present in this exemplary embodiment but are not necessary and can be replaced with an arched support brace 215 as shown in FIG. 10B. The location of the arched support brace 215 in FIG. 10B is exemplary only and can be placed higher or lower along angled cradle supports 204.

FIG. 10B depicts a front view of an embodiment of the cradle of the present disclosure that includes the cradle foot mechanism 202 within the angled cradle supports 204. Cradle foot handles 214 are located at the top of the angled cradle supports 204 in this embodiment, permitting access to the handles for rotating the cradle feet 203 at the top of the cradle supports 204. Such embodiments also are often configured to include notch 210 (not depicted in FIG. 10B) in the manner and for similar reasons such a mechanism is included in the embodiments of FIGS. 9A and 9B discussed herein. Placing the cradle foot handles 214 at the top of the angled cradle supports 204 provides an alternative location for accessing the ability to rotate cradle feet 203. Such alternative location is often advantageous for a user of the device so that the rotation of the cradle feet 203 can be controlled by hand while the user is standing up. Also as noted, this embodiment of the cradle 200 includes an arched support brace 215. The arched support brace 215 is generally shaped to conform to the cylindrical form of a hot water heater and may provide another point of contact of the cradle 200 with the hot water heater for stability purposes. The location of the arched support brace 215 in FIG. 10B is exemplary only and can be placed higher or lower along angled cradle supports 204. In certain embodiments, two or more arched support braces 215 are included in the cradle 200.

Figures 11A, 11B:
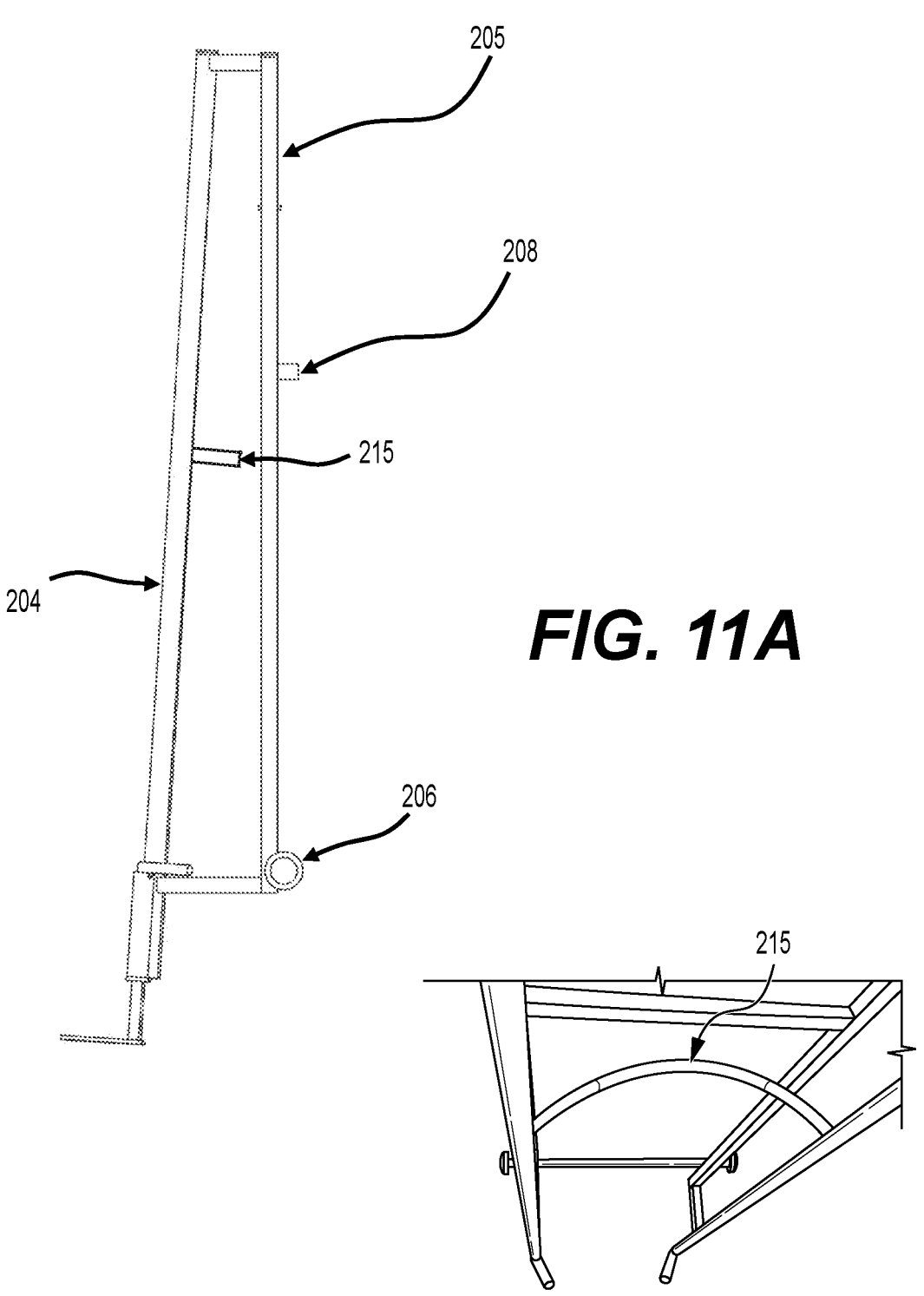
FIG. 11A depicts a side view of an embodiment of the cradle of the present disclosure.
FIG. 11B depicts a top perspective view of an embodiment of the cradle of the present disclosure having an arched support brace.

FIG. 11A depicts a side view of an embodiment of the cradle of the present disclosure. Vertical 205 and angled 204 cradle supports can be seen. The angled support is positioned relative to the vertical support to occupy space between the cradle/dolly and the hot water heater. Hot water heaters are often held in drain pans and at position off of the ground, which means there will always be a space between any dolly and the hot water heater. These drain pans are generally connected with dedicated drain lines and therefore the drain pans cannot be disconnected or moved while the hot water heater is installed. So, in order to remove a hot water heater, it needs to be lifted over the lip of the installed drain pan. The physical arrangement of the vertical and horizontal supports permits the cradle to fill the space between the dolly and the hot water heater to permit attachment of the hot water heater strap 201. The distance between vertical support 205 and angled support 204 at the top position on the cradle often ranges between 3 to 8 inches. The distance between vertical support 205 and angled support 204 at the bottom position on the cradle often ranges between 6 to 16 inches.

FIG. 11B depicts a top perspective view of an embodiment of the cradle of the present disclosure having an arched support brace 215.

Figure 12A:
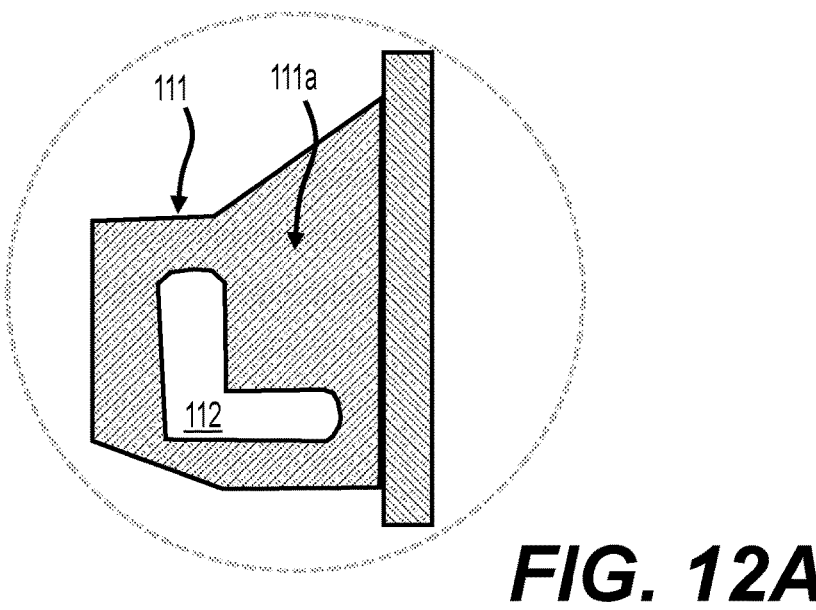
FIG. 12A depicts a close-up view of a multi-position embodiment of the axle guide of the dolly of the present disclosure, without the axle present.
Figure 12B:
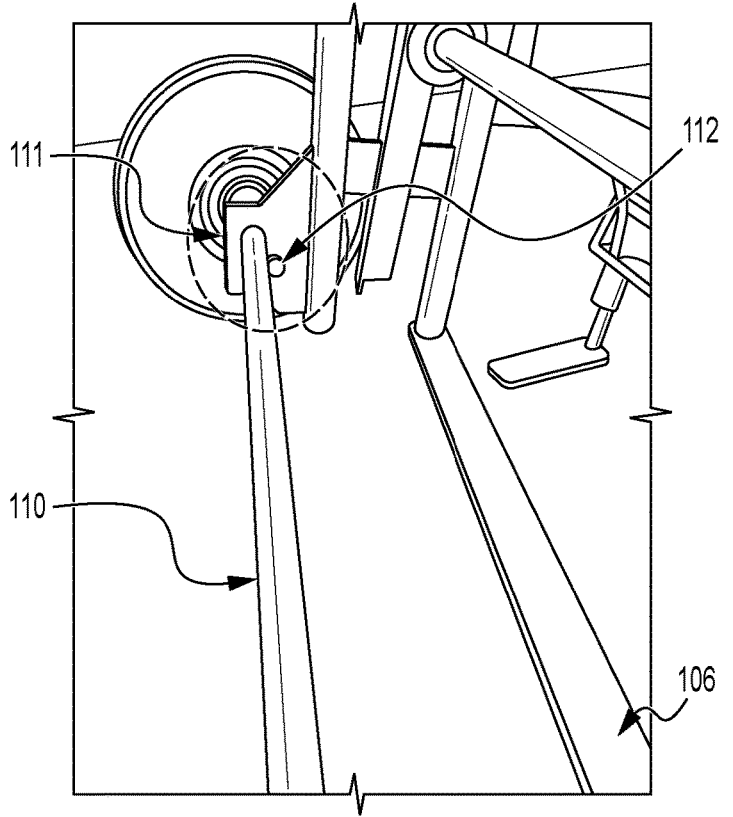
FIG. 12B depicts a side view of a multi-position embodiment of the axle guide of the dolly of the present disclosure, with the axle present.

FIG. 12A depicts a close-up view of a multi-position embodiment of the axle guide 111 of the dolly of the present disclosure, without the axle present. An approximately L-shaped opening is depicted that acts as a channel 112 for the dolly axle 110. While an L-shape is depicted, other arrangements can be provided for the axle channel 112, including adaptations specifically intended to ease movement between distal ends of the channel and seating of the axle in either distal end of the channel. In addition, while a specific position of the axle channel is depicted, the positioning may be varied anywhere within the area 111a of the axle guide 111. Overall, the purpose of the multi-position axle guide 111 is to permit positioning of the axle of the dolly from a normal operational position to a position closer to the fulcrum where the weight of the hot water heater will be held and rotated during a lift or placement operation. This fulcrum is the dolly base 106, which can be seen resting on the ground in FIG. 12B. With the axle moved to a position that is closer to the fulcrum, less force is required to rotate a hot water heater up from its installed position through to a position supported on the dolly axle and wheels.

FIGS. 12C, 12E and 12F depict alternative embodiments of the axle guide as a multi-position axle guide. FIGS. 12C and 12E depict an alternative orientation of the L-shaped axle channel 112. FIGS. 12E and 12F provide embodiments of the axle guide having alternative options for the axle channel, including two axle channels, 112, 112a. An axle channel 112a is configured to fit the axle 110 with minimal movement—permitting rotation of the axle 110 only, and the other axle channel 112 is configured as a multi-position axle channel. The axle may be removed and slotted through axle channel 112 or 112a, depending on the preference of the user and/or specific lifting and/or carrying requirements for the system. FIG. 12D provides another alternative of the axle guide 111 as proving only a single opening for the axle 110, configured to fit the axle 110 with minimal movement—permitting rotation of the axle 110 only. As indicated in connection with FIG. 12A, while a positioning of the axle channel(s) is/are depicted, the positioning may be varied anywhere within the area 111a of the axle guide 111. While not specifically depicted in FIGS. 12A-12E, the axle guide in each of these embodiments may be configured to accept bearings race at a location or locations in the axle channel to provide for enhanced ease of rotation of the axle 100 in the axle channel. For example, bearings (e.g., pin bearings) may be positioned at either or both distal ends of the axle channel 112 and/or at any portion (or all) of axle channel 112. Embodiments including axle channel 112a may be fitted with a round bearing race.

FIGS. 13A, 13B and 13C depict alternative embodiments of the axle guide as a multi-position axle guide. The embodiment of FIGS. 13A-13C is often the most frequently included embodiment of the multi-position axle guide. As indicated, this embodiment provides for the axle to travel between in front of or behind the vertical support 114 where the wheels 102 attach the dolly 100. This provides enhanced leverage when lifting heavy objects (e.g., hot water heater) by positioning the axle 110 in front of the vertical support 114 where the wheels are attached when, for example, lifting the heavy object and then permitting the axle 110 to be moved behind the vertical support 114 where the wheels are attached when, for example, transporting the heavy object. In addition, with the axle placed closer to the vertical support 114 where the wheels are attached, enhanced operational stability of the system is provided. The axle 110 can move within axle channel 112 of the axle guide 111 between forward of the vertical support 114 where the wheels are attached behind the vertical support 114 where the wheels are attached in a procedure analogous to that depicted in FIGS. 14A-14C. In such operation, the axle moves between the top position behind the vertical support 114 and the top position in front of the vertical support 114 through the axle 112 channel.

Figure 14A:
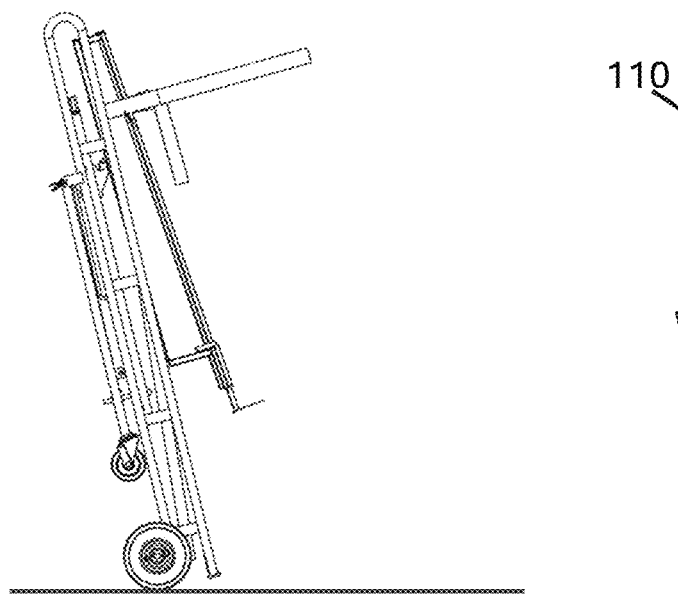
FIG. 14A depicts the relative positioning and angulation of the dolly relative to the ground approaching a hot water heater before lifting.
Figure 14B:
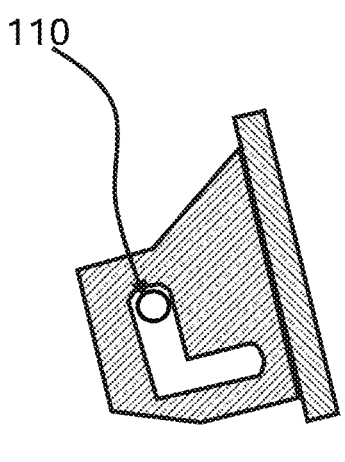
FIG. 14B depicts the positioning of the axle of the dolly in the multi-position axle guide during the approach to a hot water heater before lifting.

FIG. 14A depicts the relative positioning and angulation of the dolly relative to the ground approaching a hot water heater before lifting. FIG. 14B depicts the positioning of the axle of the dolly in the multi-position axle guide during the approach to a hot water heater before lifting. As can be seen the dolly axle 110 is positioned in the top portion of the channel 112 during the approach.

Figure 14C:
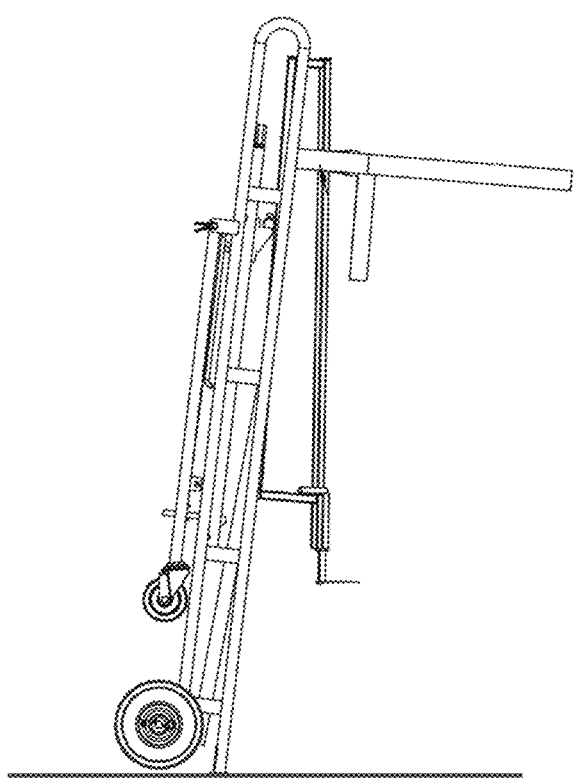
FIG. 14C depicts the relative positioning and angulation of the dolly relative to the ground when beginning an exemplary lift of a hot water heater, with the wheels of the dolly lifted off of the ground to permit re-positioning of the dolly axle.
Figure 14D:
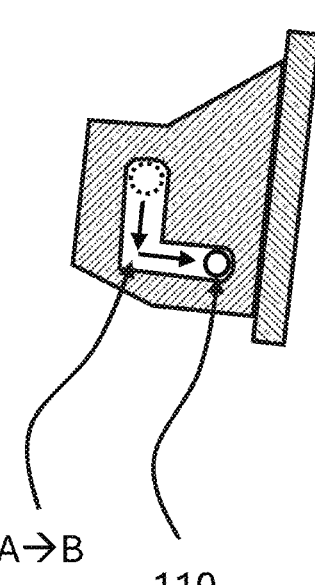
FIG. 14D depicts the movement of the axle in the multi-position axle guide between a position A (default position) to position B (lift position) when beginning an exemplary lift of a hot water heater.

FIG. 14C depicts the relative positioning and angulation of the dolly relative to the ground when beginning an exemplary lift of a hot water heater, with the wheels of the dolly depicted as lifted off (not touching) of the ground to permit re-positioning of the dolly axle in the multi-position axle guide 111. As can be seen, the dolly base 106 is positioned on the ground, with the dolly wheels lifted off of the ground, thereby permitting the dolly axle to move in the channel 112. FIG. 14D depicts the movement of the axle in the multi-position axle guide 111 between a position A (default position) to position B (lift position) when beginning an exemplary lift of a hot water heater. The dolly axle can be actuated to move between position A (default position) and position B (lift position) by the operator, depending on the function and/or axle position desired. For example, the default position is often used for normal dolly operation as it positions the load carried by the dolly closer to the ground. The lift position is used most often for lifting and/or re-positioning heavy items (often at the beginning or end of a lift) held by the dolly/cradle since the fulcrum of rotation in the lift position is placed more vertically under the weight of the carried load, which has clear force-related implications for the user of the system.

FIG. 15A depicts a side view of an embodiment of the cradle attached to the dolly of the present disclosure in a vertical position with the dolly support in a partially deployed position and holding a hot water heater just after lifting the hot water heater out of the drain pan 301 or just before setting the hot water heater into the drain pan 301.

FIG. 15B depicts a side view of an embodiment of the cradle attached to the dolly of the present disclosure in a vertical position with the dolly support in a partially deployed position and holding a hot water heater as the hot water heater is lifted away from the drain pan 301 or as the hot water heater moved toward the drain pan 301.

FIG. 15C depicts a side view of an embodiment of the cradle attached to the dolly of the present disclosure in a vertical position with the dolly support in a fully deployed position and holding a hot water heater as the hot water heater is rolled away from the drain pan 301 or as the hot water heater is rolled toward the drain pan 301.

The presently described lifting system is uniquely designed for one operator to safely install or replace a hot water heater without help of a second person. One operator is able to lift a hot water heater up and out of a drain pan mounted on an elevated platform, move it to another place and deposit it on the ground with very little physical effort and most importantly without a second operator. This device can then be used to lift a replacement hot water heater from the ground and deposit it into that a same elevated drain pan without damaging said drain pan. In addition, this device can also be easily modified to be used as a standard dolly to move other heavy, bulky objects. Foremost and most importantly is that most Workman's Compensation Insurance cost may be reduced or eliminated, along with reduced cost not needing a second helper.

The lifting system is to be made by welding soft steel together predominately 16-gauge round steel tubing providing adequate strength and yet reducing the overall weight that will allow for certain parts to articulate for its movement to accomplish the job.

At the bottom of the lifting system is the detachable dolly lift skid that is removed when installing or replacing a hot water heater. The skid is easily reattached for standard use of the dolly.

The cradle is tapered to account for the gap, typically five to six inches, between the lifting system and the hot water heater. The track for the cradle is welded between the upright support beams of the dolly at an angle that further reduces that distance between the lifting system and the hot water heater as the wheels of the cradle travel up that track. This design feature allows the water heater to be lifted out of the drain pan without damaging the pan or dragging it off the platform. The platform would otherwise prevent a standard dolly from direct contact with the water heater.

The axle at the base of the lifting system is designed to permit it to move toward the hot water heater thereby moving the fulcrum, increasing leverage and taking advantage of gravity as the operator tips the dolly toward the hot heater. This process occurs automatically when the lifting mechanism (e.g., screw drive) is moved in an upward manor to elevate lift of the cradle in preparation of the actual lifting process.

By placing one foot against the axle, this movement is revealed as the lifting mechanism is actuated by a, for example, normal 18-volt screw gun at the top of the lifting mechanism.

As the operator pulls the lifting system back, the water heater comes straight up and out of the drain pan and once the operator feels they have reached that certain point when the weight is on the down slope, they can either take the right hand off and depress a rear wheel locking Latch, or by tapping dolly axle with their foot to allow the rear wheels to move in the axle channel, the dolly support to deploy and the continue to lower the dolly so that all the weight is located on all four wheels of the dolly.

After pulling the lifting system back, it is suggested that the operator once again use the 18-volt screw gun to lower the water heater nearly to the ground before moving it to another place to aid in stability. Once performed, the operator can freely move the dolly and heater to whatever location they wish on all four dolly wheels for unstrapping in an upright position.

Now to replace a new Heater in the drain pan and on the elevated platform. Pick up the cradle and place against the heater and hold the cradle against the heater while placing one hand on the top edge and pushing away from the operator allowing the two small feet to slide in and under the water heater. With the two small handles the feet can be directed towards and under the tank. The strap on the cradle should stay in place and tightened reasonably tight.

The dolly is then moved into position and the wheels aligned within the dolly and lifting mechanism is used to elevate the cradle with, e.g., a screw gun until the screw drive latch on the screw fits into the cradle hold on the cradle. After this, the user places their foot against the axle and continues elevating the Screw Gun, where the axle moves forward into the lifting position in the axle channel.

Now the dolly is pulled back and returned to the rear set of wheels on the dolly support in the open and locked position. Now using the screw gun, the water heater may be elevated to a position that will allow the tank to clear the drain pan and be deposited into the drain pan by lowering the tank into the pan. As the lifting mechanism is lowered, the hot water heater will separate from the cradle (i.e., the cradle hold 208 will separate from the screw drive latch 108) and you can roll the dolly away.

Thereafter the strap can be removed and the cradle feet can be removed from under the hot water heater.

Features Unique to the Present System Include at Least the Following:

a. A removable or detachable dolly lift skid.

b. A dual positionable axle allowing for movement of the heater in order for it to clear the pan on extraction, and replacement in the drain pan.

c. A lifting mechanism (e.g., screw drive, a rack and pinion system, hydraulic and/or or pneumatic cylinder, chain and sprocket or belt and pulley system, a lever and linkage mechanism, a worm gear mechanism, a cam and follower mechanism, or a winch and drum system) ability and screw attachment for the lifting process of raising the cradle including nuts, screws, washers and bearings.

d. The cradle concept and the maneuverable cradle feet that can rotate and go into the drain pan and turn in and under the heater, and lock in position.

e. The idea of using four wheels allowing the weight to be so distributed that an 18-volt screw gun can be all that is necessary for the power to raise and/or lower such a heavy object.

f. The lifting system can easily lift up to a 75 gallon hot water heater with a single operator.

The following non-limiting embodiments present various configurations of the lifting system. Each embodiment functions as a fully operable system that a skilled person could manufacture and use without reference to external features.

Embodiment 1—Baseline Integrated System (Standard Configuration)

This embodiment employs the standard steel-tube dolly frame with a fixed dolly base, dual primary wheels on a multi-position axle, and a deployable dolly support carrying twin support wheels. A centrally mounted, permanently affixed lifting mechanism terminates in a latch that interlocks with a cradle hold positioned on the geometric centerline of the cradle. The cradle includes angled and vertical supports sized to fill the typical five-to-six-inch gap created by an elevated drain pan, and further includes a foot mechanism with rotatable feet lockable by a notch in the foot housing. A woven strap fitted with a buckle (no magnet in this baseline) secures the water heater to the cradle. During use, the operator (i) latches the cradle to the lifting mechanism, (ii) re-positions the axle from the approach slot of the guide to the lift slot, (iii) elevates the heater clear of the drain pan, and (iv) rotates the load until the support wheels deploy and all four wheels assume the weight for transport.

Embodiment 2—Deployable Support with Removable Skid Plate

All structural elements of Embodiment 1 are retained, but the front aspect of the dolly further includes a detachable lift skid fastened by keyed notches and spring clips to the lower frame. In "water-heater mode" the skid is removed, allowing the dolly base, angled cradle supports, and rotatable feet to insert fully into a confined closet or alcove; in "hand-truck mode" the skid plate is attached, creating a continuous footplate suitable for boxes or rectangular appliances. Integration of the skid does not interfere with axle travel, cradle track alignment, or lifting mechanism engagement, and switching between modes requires no tools.

Embodiment 3—Lateral, Removable Lifting Mechanism

In this configuration the lifting mechanism is fabricated as a detachable module provided with semi-cylindrical clips that engage any transverse cross-support on the dolly frame. The cradle therefore carries multiple cradle-hold apertures: one on the longitudinal centerline and one each offset one to eight inches to the right and left. When the lifting mechanism is clipped in an off-center position—e.g., to clear protrusions on an irregular tank—the operator aligns the appropriate cradle hold with the latch, then executes the same lift sequence as Embodiment 1. When the lifting mechanism is removed entirely, the dolly converts to a conventional hand truck without any projecting latch that would otherwise strike the load.

Embodiment 4—Dual Lifting Mechanism Lift (High-Capacity System)

Here the dolly frame is widened and fitted with two parallel lifting mechanisms, each terminating in a respective latch. The cradle is widened accordingly, carries two spaced cradle holds, and is driven symmetrically by both lifting mechanisms, thereby doubling lift capacity and improving torsional stability when hoisting, for example, 75-gallon heaters. The multi-position axle guide remains a single channel but is lengthened to accommodate the greater frame width, and bearings are installed in both distal ends for reduced friction during axle translation.

Embodiment 5—Single-Position Axle Guide (Economy Variant)

For cost-sensitive applications the axle guide is replaced with a circular bore that permits axle rotation only. Because the fulcrum cannot migrate, leverage is instead managed by sizing the dolly wheels larger (e.g., ten inches diameter) and adding a longer handle section, both of which reduce required operator force. All other system components—including the lifting mechanism, cradle with rotatable feet, strap, and deployable dolly support—remain as in Embodiment 1, thereby maintaining full single-operator functionality.

Embodiment 6—Bearing-Enhanced Axle Guide

This embodiment employs the L-shaped, dual-slot axle guide of the principal disclosure but press-fits needle or pin bearings into both the approach and lift pockets. As the operator elevates the cradle, the axle glides with negligible friction to the lift pocket, allowing heavier tanks to be raised with, for example, a power tool such as an 18-volt drill (or greater). The remainder of the system—including cradle, lifting mechanism, strap, and support wheels—mirrors Embodiment 1, and no user-perceptible change in operating steps is required.

Embodiment 7—Strap with Integral Magnet (Single-Operator Alignment Aid)

Building on the baseline configuration, the securing strap incorporates a neodymium magnet embedded in one free end. When the operator reaches partially around a steel-skinned heater, the magnet temporarily tacks the strap to the tank wall, freeing the operator's hand to retrieve the opposite end and engage the buckle. The magnetic addition does not alter the cradle geometry, the lifting mechanism interface, or the dolly's weight distribution; it simply accelerates the strapping step and is most valuable in tight closets where a second person cannot assist.

Embodiment 8—Cradle Re-Profiled for Non-Water-Heater Cylinders

In this embodiment the same dolly, axle, lifting mechanism, and strap assemblies are retained, but the cradle is fabricated with interchangeable liner plates allowing its inner contour to match oxygen cylinders, propane tanks, or compressed-air bottles. The liner plates secure to the vertical and angled supports with quick-release pins, and the rotatable feet include arcuate pads sized to nest against smaller diameters. Consequently, the system services diverse cylindrical loads without sacrificing the gap-bridging advantage essential for water-heater installations.

Embodiment 9—Four-Wheel Static Transport Mode

This variation emphasizes post-lift mobility. The dolly support is engineered to lock at a fully deployed angle that places its wheels co-planar with the primary wheels, creating a stable four-wheel carriage once the heater has cleared the drain pan. The lifting mechanism is then used to lower the load until its center of gravity resides well below the axle, maximizing stability during hallway transit. The strap remains secured throughout, and the cradle stays latched to the lifting mechanism, permitting reverse operation upon reaching the installation site.

Embodiment 10—Multi-Position Axle Guide

All features of Embodiments 1-9 may be included, but the frame includes a muti-position axle guide configured to permit the axle of the system to move in the muti-position axle guide between different positions. According to certain aspects of this embodiment, the muti-position axle guide permits the axle of the system to be positioned in one or more positions in front of and/or behind a main support of the dolly as disclosed herein.

Each foregoing embodiment describes the entirety of the claimed cylinder-lifting system as an integrated, operable whole. Variations are introduced at the sub-assembly level—dolly frame, axle guide, lifting mechanism, cradle geometry, foot mechanism, securing means, or material specification—yet every embodiment retains the co-operation of: (i) a dolly base supporting a multi-wheel structure, (ii) a cradle movable on angled tracks and positively latched to a power-driven lifting mechanism, (iii) a strap-based securing protocol, and (iv) optional deployable support wheels that stabilize the system during rotation and transport. Accordingly, each embodiment falls within the scope of the claims while illustrating distinct, non-limiting ways in which the inventive principles may be realized.

The example embodiments are provided solely to illustrate the invention by reference to specific embodiments.

These exemplifications, while illustrating certain specific aspects of the invention, do not portray the limitations or circumscribe the scope of the disclosed invention.

Many variations to those described above are possible. Since modifications and variations to the examples described above will be apparent to those of skill in this art, it is intended that this invention be limited only by the scope of the appended claims.

The invention claimed is:

1. A cylinder lifting system, comprising:
   a dolly having a dolly base, one or more handles, a deployable dolly support having a plurality of dolly support wheels and that is positionable between a closed position and a deployed position, a dolly axle, a multi-position axle guide, at least one of the plurality of dolly support wheels positioned on each end of opposing ends of the dolly axle, a lifting mechanism, a lifting mechanism latch, means for releasably securing the dolly support to the dolly in the closed position, and a plurality of tracks;
   a cradle adapted to movably interface with the dolly base and including a plurality of cradle wheels, each cradle wheel being adapted to interface with one of the plurality of tracks, a foot mechanism having rotatable feet and means for rotating the rotatable feet, a means for securing the foot mechanism in a lifting position, a strap adapted to wrap around a cylinder, a cradle hold adapted to operably interface with the lifting mechanism latch, and supports adapted to support the cradle,
   wherein the lifting mechanism incorporates the lifting mechanism latch, and the lifting mechanism is adapted to move the lifting mechanism latch between vertical positions,
   and wherein the multi-position axle guide is adapted to permit the dolly axle to be securably positioned in one or more positions vertically and/or horizontally relative to the dolly.

2. The cylinder lifting system of claim 1, wherein the lifting mechanism is a screw drive.

3. The cylinder lifting system of claim 1, wherein the strap further includes a magnet adapted to secure to a metal hot water heater.

4. The cylinder lifting system of claim 1, wherein the means for securing the foot mechanism in the lifting position comprises a notch in the foot mechanism adapted to secure the rotatable feet.

5. The cylinder lifting system of claim 1, wherein the cylinder is a hot water heater.

6. The cylinder lifting system of claim 1, wherein the lifting mechanism is removable from the dolly.

7. The cylinder lifting system of claim 1, wherein the dolly further comprises a detachable lift skid plate removably attached to the dolly base.

8. The cylinder lifting system of claim 1, wherein the dolly further comprises dolly cross-supports, and the lifting mechanism is laterally repositionable along the dolly cross-supports.

9. The cylinder lifting system of claim 1, wherein the dolly includes two parallel lifting mechanisms.

10. The cylinder lifting system of claim 1, wherein the multi-position axle guide includes bearings at one or more positions to reduce friction during axle movement.

11. The cylinder lifting system of claim 1, wherein the cradle dolly comprises a detachable lift skid.

12. The cylinder lifting system of claim 1, wherein the multi-position axle guide is adapted to permit the dolly axle to be securably positioned horizontally in front of and behind a support of the dolly.

13. A method of removing a hot water heater from an installed position comprising:
   moving the cylinder lifting system of claim 1 toward the hot water heater positioned in a resting position;
   attaching the strap around the hot water heater to secure the cradle to the hot water heater;
   rotating the dolly on the dolly base toward the hot water heater and actuating the lifting mechanism to move the lifting mechanism latch vertically upward to engage with the cradle hold;
   continuing to actuate the lifting mechanism to lift one end of the hot water heater;
   placing the rotatable feet under the hot water heater to a lift position and securing the means for rotating the rotatable feet in the means for securing the foot mechanism;
   moving the dolly axle from a first position to the lifting position, wherein the lifting position is closer to the hot water heater than the first position;
   actuating the lifting mechanism to lift the hot water heater up and away from the installed position;
   with the hot water heater attached, rotating the dolly on the dolly base away from the hot water heater;
   deploying the dolly support to a support position;
   continuing to rotate the hot water heater away from the installed position until it is supported on the plurality of dolly support wheels;
   actuating the lifting mechanism to lower the hot water heater.

14. The method of claim 13, further comprising removing a detachable lift skid plate from the dolly prior to attaching the strap around the hot water heater.

15. The method of claim 13, wherein the dolly comprises dolly cross-supports, and the method further comprises repositioning the lifting mechanism laterally along the dolly cross-supports prior to attaching the strap around the hot water heater.

16. The method of claim 13, wherein the dolly comprises a detachable lift skid.

17. The method of claim 13, further comprising deploying the dolly support to a fully extended position to create a four-wheel carriage for stable transport.

18. The method of claim 13, wherein the strap includes a magnet to facilitate single-operator use.

19. The method of claim 13, wherein the system is used to lift and transport a hot water heater up to 75 gallons in capacity.

* * * * *